US012682474B2

(12) United States Patent (10) Patent No.: US 12,682,474 B2
Aso (45) Date of Patent: Jul. 14, 2026

(54) COMPUTER-READABLE RECORDING MEDIUM STORING DESIGN ASSIST PROGRAM, DESIGN ASSIST METHOD, AND DESIGN ASSIST APPARATUS

(71) Applicant: Fujitsu Limited, Kawasaki (JP)

(72) Inventor: Noriyasu Aso, Fujisawa (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 18/657,848

(22) Filed: May 8, 2024

(65) Prior Publication Data

US 2024/0412396 A1    Dec. 12, 2024

(30) Foreign Application Priority Data

Jun. 7, 2023    (JP) ................................. 2023-094433

(51) Int. Cl.
| *G06T 7/564* | (2017.01) |
| *G06T 7/60* | (2017.01) |
| *G06T 19/20* | (2011.01) |
| *G06V 10/74* | (2022.01) |
| *G06V 10/764* | (2022.01) |
| *G06V 20/64* | (2022.01) |

(52) U.S. Cl.
CPC ............... *G06T 7/564* (2017.01); *G06T 7/60* (2013.01); *G06T 19/20* (2013.01); *G06T 2219/2021* (2013.01); *G06V 10/761* (2022.01); *G06V 10/764* (2022.01); *G06V 20/64* (2022.01)

(58) Field of Classification Search
CPC .................................. G06T 7/564; G06T 7/60
See application file for complete search history.

(56) References Cited

U.S. PATENT DOCUMENTS

| 2014/0136156 A1* | 5/2014 | Divekar .................. G06F 30/00 |
| | | 703/1 |
| 2020/0151286 A1 | 5/2020 | Willis et al. |
| 2022/0148277 A1* | 5/2022 | Aso ......................... G06T 19/00 |

FOREIGN PATENT DOCUMENTS

| JP | 7-182391 A | 7/1995 |
| JP | 2010-211434 A | 9/2010 |
| JP | 2022-75139 A | 5/2022 |

* cited by examiner

*Primary Examiner* — Shivang I Patel
(74) *Attorney, Agent, or Firm* — Fujitsu Intellectual Property Center

(57) ABSTRACT

A computer-readable recording medium stores a specifying program for causing a computer to execute a process. The process includes: calculating a first distance between a center point of each shape data and a straight line on a same plane as the center point, for a specific portion of which the center point is defined, from among a plurality of portions included in a shape indicated by each shape data classified into the same group; adding the calculated first distance to dimensional information of the specific portion in each shape data; and specifying a dimensional relationship between different portions of the shape data in the group, based on the dimensional information for each portion of each shape data in the group.

10 Claims, 30 Drawing Sheets

1101 1102 1103

1101 1102 1103

1 : 2 : 1     1 : 2 : 1     1 : 2 : 1

$$b_0 = 4 \times b_1$$
$$b_1 = b_3$$
$$b_2 = 2 \times b_1$$

| | s1 | s2 | s3 | s4 | s5 | s6 | s7 | s8 | s9 | s10 | s11 | ⋯ |
|---|---|---|---|---|---|---|---|---|---|---|---|---|
| SHAPE A | 40 | 5 | 1 | 5 | 8 | 16 | 12 | 4 | 1 | Φ1 | Φ1 | |
| SHAPE B | 90 | 10 | 1 | 5 | 18 | 36 | 27 | 9 | 1 | Φ1 | Φ1 | |
| SHAPE C | 30 | 5 | 1 | 2.5 | 6 | 12 | 9 | 3 | 1 | Φ1 | Φ1 | |
| SHAPE D | 50 | 5 | 1 | 2.5 | 10 | 20 | 15 | 5 | 1 | Φ1 | Φ1 | |
| SHAPE E | 30 | 10 | 1 | 5 | 6 | 12 | 9 | 3 | 1 | Φ1 | Φ1 | |
| ⋯ | ⬇ | ⬇ | ⬇ | | | | | | | | | |

$$v = [v_1, \quad v_2, \quad v_3, \cdots \qquad\qquad , v_n]$$

$$d_i = d_0/(n-1)$$

$d_i = d_1/(2-1)$ $d_i = d_2/(3-1)$ $d_i = d_3/(4-1)$

COMPUTER-READABLE RECORDING MEDIUM STORING DESIGN ASSIST PROGRAM, DESIGN ASSIST METHOD, AND DESIGN ASSIST APPARATUS

CROSS-REFERENCE TO RELATED APPLICATION

This application is based upon and claims the benefit of priority of the prior Japanese Patent Application No. 2023-94433, filed on Jun. 7, 2023, the entire contents of which are incorporated herein by reference.

FIELD

The embodiments discussed herein are related to a specifying program, a specifying method, and an information processing apparatus.

BACKGROUND

Typically, since designing and drawing of a three-dimensional (3D) shape take a lot of man-hours, diversion design using past 3D shape data is sometimes performed. Meanwhile, the past 3D shape data is often insufficiently classified and there are a large number of similar shapes. Therefore, when newly designing a similar shape of an existing product, it is desirable to appropriately classify the past 3D shape data and standardize the design object. For example, if it is possible to appropriately classify the past 3D shape data and derive a dimensional relationship (parametric model) between portions of a 3D shape, it is possible to perform parametric design.

As related art, there is a computer aided design (CAD) system used to parametrically create standard parts. Furthermore, there is a technique for acquiring a partial shape added to an input shape model as a difference shape, searching for a shape similar to the difference shape from a plurality of basic shapes, extracting a shape parameter of the difference shape, and determining whether or not the shape parameter of the difference shape satisfies a design rule of the searched basic shape. Furthermore, there is a technique for preparing an editable model of an object using a parametric function history including a sketching function, forming a 3D model of the object in a boundary representation format by combining extruded versions of a smooth curve, and reforming a subset of a smooth curve in response to a user's input regarding the sketching function.

Japanese Laid-open Patent Publication No. 7-182391, Japanese Laid-open Patent Publication No. 2010-211434, and U.S. Patent Application Publication No. 2020/0151286 are disclosed as related art.

SUMMARY

According to an aspect of the embodiments, a computer-readable recording medium storing a specifying program for causing a computer to execute a process including: calculating a first distance between a center point of each shape data and a straight line on a same plane as the center point, for a specific portion of which the center point is defined, from among a plurality of portions included in a shape indicated by each shape data classified into the same group; adding the calculated first distance to dimensional information of the specific portion in each shape data; and specifying a dimensional relationship between different portions of the shape data in the group, based on the dimensional information for each portion of each shape data in the group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is an explanatory diagram illustrating a construction example of a relational expression indicating a dimensional relationship between portions;

DESCRIPTION OF EMBODIMENTS

In the related art, for 3D shape data including a curve portion, a hole, or the like, it is not possible to appropriately derive a dimensional relationship between different portions of the 3D shape data, and it is difficult to construct a parametric model that reflects a design intent.

In one aspect, an object of the embodiment is to add a new dimension for a specific portion and derive a dimensional relationship between different portions of shape data.

Hereinafter, embodiments of a specifying program, a specifying method, and an information processing device will be described in detail with reference to the drawings.

Embodiment

Figure 1:
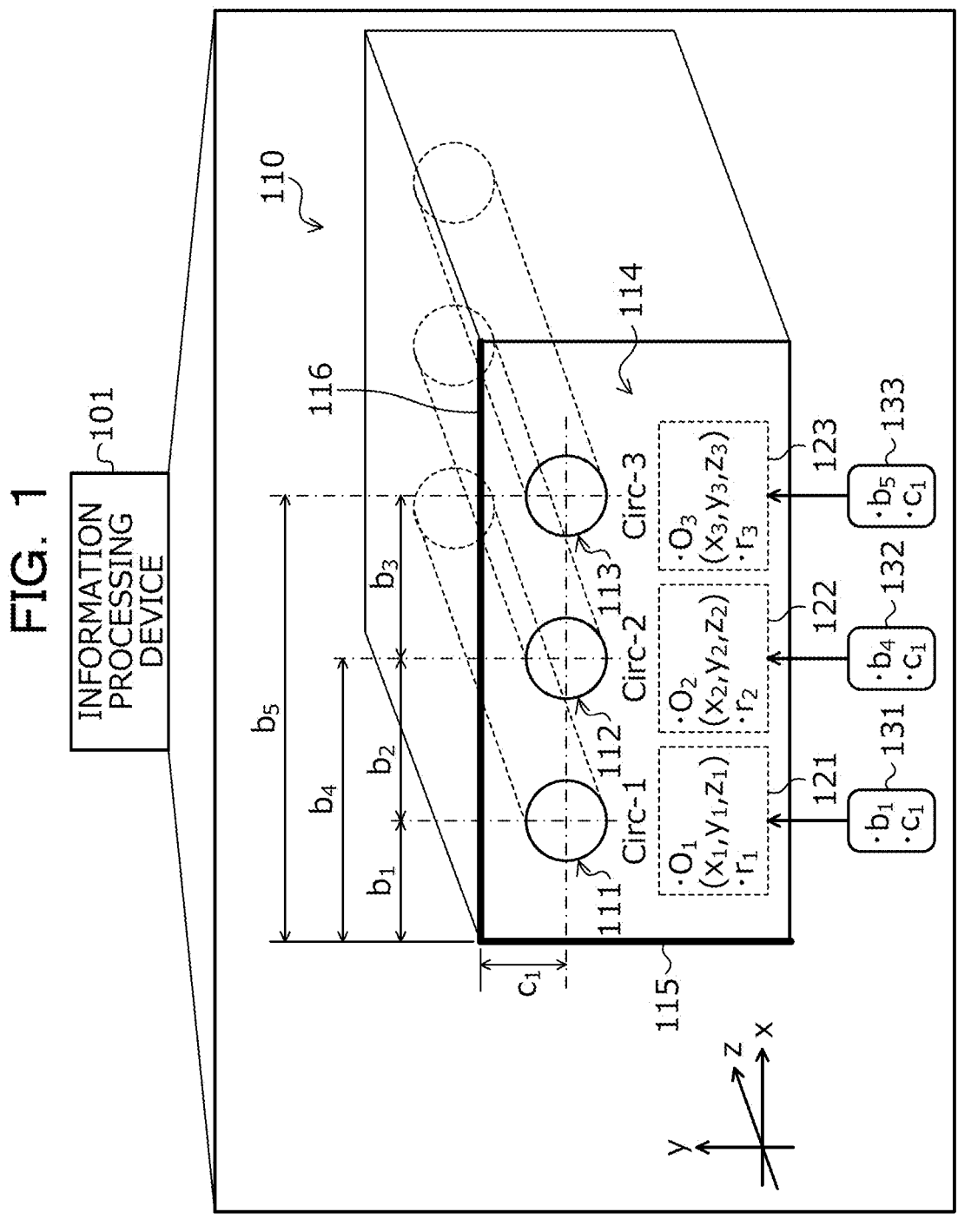
FIG. 1 is an explanatory diagram illustrating an example of a specifying method according to an embodiment.

FIG. 1 is an explanatory diagram illustrating an example of a specifying method according to an embodiment. In FIG. 1, an information processing device 101 is a computer that supports design of an object. The object is an object to be designed and is, for example, a three-dimensional object such as a part, a product, a construction member, or a building.

Here, since it takes a lot of man-hours to design a 3D shape, it would be very useful if diversion design using past 3D shape data could be performed. Meanwhile, the past 3D shape data is often insufficiently classified, and there are a large number of similar shapes, so it takes time and effort to manually search for 3D shape data according to a design intent.

Therefore, when newly designing a similar shape of an existing product, it is desirable to appropriately classify the past 3D shape data and standardize the design object. For example, if the past 3D shape data can be appropriately classified and a dimensional relationship (parametric model) between portions of a 3D shape can be derived, design for defining the 3D shape (so-called parametric design) can be performed by setting various dimensions for the model.

As a method for classifying the past 3D shape data, there is a method for comparing pieces of 3D shape data with each other to obtain a similarity, and classifying the 3D shape data based on the similarity. For example, it is conceivable to search for 3D shape data to be classified into the same group, based on the similarity between the 3D shape data and 3D shape data designated as a target.

In this classification method, 3D shape data having the same shape as the target or a geometrically similar shape is searched. However, there are some 3D shape data having a dimensional relationship and some 3D shape data having no dimensional relationship between portions depending on the design intent although the 3D shape data have a similar shape, and not only the pieces of 3D shape data with the same shape or similar shape are the 3D shape data to be classified into the same group.

Furthermore, it is also conceivable to manually check the past 3D shape data one by one and classify the past 3D shape data in consideration of design intent. However, there is a problem that it takes time and effort to manually classify a huge amount of 3D shape data, which in turn increases the man-hours needed for designing the object. Moreover, it is difficult for anyone other than a designer to judge the design intent from the 3D shape data.

Furthermore, there is a technique (referred to as "related art 1") for constructing a parametric model by classifying a plurality of pieces of 3D shape data based on unit 3D shape data obtained by normalizing each 3D shape data and specifying a dimensional relationship between portions in the 3D shape data classified by the unit 3D shape data. For example, the 3D shape data is design data designed in the past using three-dimensional computer aided design (CAD).

In the related art 1, for example, the 3D shape data is normalized for each component in each coordinate axis direction to create the unit 3D shape data. Normalizing the 3D shape data for each component in each coordinate axis direction means converting the 3D shape data while maintaining the dimensional relationship between portions in each coordinate axis direction (for example, x-axis, y-axis, or z-axis direction).

By determining the similarity based on the unit 3D shape data, it is possible to classify those with the same side ratio in each coordinate axis direction, and it can be expected that not only the same shape as or similar shape to the target but also shapes having partially different lengths can be classified into the same group. Note that, regarding the related art 1, for example, JP 2022-75139 A can be referred.

However, in the related art 1, regarding 3D shape data including a curve portion, a hole, or the like, it is not possible to appropriately read the design intent, and it is difficult to find the dimensional relationship between the portions. For example, regarding a straight line, CAD data of a 3D shape includes an attribute of a straight line as well as coordinates of an end point and a length.

On the other hand, regarding a hole, an attribute indicating a curve as well as coordinates of a center point and a radius are included. Furthermore, regarding a curve portion, an attribute indicating a curve as well as coordinates of a center point, a radius, a center angle (center angle), and coordinates of an end point are included. The designer may arrange the center point, in consideration of a distance to another portion (for example, side) or the like, for the portions such as the curve portion or the hole.

However, the CAD data of the 3D shape does not include information or the like regarding a distance between a portion such as the curve portion or the hole and another portion. Therefore, in the related art 1, even if correspondence of an individual characteristic point can be taken from the coordinates of the center point for the curve portion or the hole, the coordinates are not dimensions. Therefore, there is a case where it is not possible to read the intention of the designer and to find a parametric relationship of dimensions between portions.

Therefore, in the present embodiment, a specifying method for deriving a dimensional relationship between different portions in the shape data by adding a new dimension regarding a specific portion in the shape data will be described. Here, a processing example of the information processing device 101 (corresponding to processing (1) to (3) below) will be described.

(1) The information processing device 101 calculates a first distance, for a specific portion, of which a center point is defined, among a plurality of portions included in a shape indicated by each of pieces of shape data classified into the same group. Here, the shape data is information indicating a shape of a design object and includes, for example, dimensional information of each portion. The portion is a shape of a part represented by the shape data. Note that, in the following description, the plurality of portions included in the shape indicated by each piece of the shape data may be simply referred to as "a portion of each shape data".

The portion is, for example, a side, a surface, a curve portion, a hole portion, or the like. The curve portion is, for example, an arc-shaped edge portion. The edge portion corresponds to a side connecting vertices to each other and indicates, for example, an end portion of a surface. The edge portion corresponds to, for example, an outline or a contour. The arc-shaped edge portion has an arc-like shape. The hole portion is, for example, a through-hole that passes through the shape data (part or all thereof) or a recessed hole on the shape data.

The dimensional information of each portion includes, for example, attribute information of each portion. The attribute information represents an attribute such as a side, a surface, a curve, or a depth in case of a recessed hole. Furthermore, the dimensional information of each portion includes, for example, position information of each characteristic point. The characteristic point is, for example, a vertex of a design object, a center point of a hole, or the like. The position information of the characteristic point indicates, for example, coordinates of the characteristic point in a rectangular coordinate system.

Furthermore, dimensional information of the portion "side" includes, for example, an attribute "straight line", coordinates of an end point (characteristic point), and a length. Furthermore, dimensional information of the portion "surface" includes, for example, an attribute "surface" and coordinates of a vertex (characteristic point). Furthermore, dimensional information of the portion "hole portion" includes, for example, an attribute "curve", coordinates of the center point (characteristic point), and a radius.

Furthermore, dimensional information of the portion "curve portion (for example, arc-shaped edge portion)" includes, for example, an attribute "curve", coordinates of the center point (characteristic point), a radius, a center angle, and coordinates of an end point (characteristic point). Note that the shape data may include, for example, color information, material information, or the like of each surface. The shape data is, for example, three-dimensional shape data and may be design data designed in the past using the three-dimensional CAD. Furthermore, the shape data may be two-dimensional shape data.

The plurality of pieces of shape data classified into the same group is shape data classified as a similar shape. As a method for classifying the shape data, any existing technique may be used. For example, as the method for classifying the shape data, the related art 1 can be used. However, in the related art 1, when the unit 3D shape data is created from the 3D shape data, there is a case where a circular shape of a portion such as a circular hole becomes an elliptical shape and accuracy of similar shape search is lowered.

Therefore, when classifying the shape data of the similar shape, for example, the information processing device 101 may delete the dimensional information of the hole from each shape data, perform unit shaping, and search for the similar shape. Note that specific processing content when the dimensional information of the hole is deleted from each shape data, the unit shaping is performed, and the similar shape is searched will be described later. Furthermore, the plurality of pieces of shape data classified into the same group may be shape data designated by a user.

Furthermore, the specific portion is, for example, a curve portion of which a center point, a radius, a center angle, and an end point are defined. Furthermore, the specific portion may be a hole portion of which a center point and a radius are defined. Furthermore, the specific portion may be a protrusion (cylindrical or conical protrusion) of which a center point and a radius are defined, for example.

The first distance is a distance between the center point of the specific portion in each shape data and a straight line on the same plane as the center point. The straight line on the same plane is, for example, a straight-line edge portion. For example, the first distance may be calculated for all the straight lines on the same plane as the center point of the specific portion. Furthermore, for example, the first distance may be calculated for a straight line closest to the center point, among the straight lines on the same plane as the center point of the specific portion.

In the example in FIG. 1, shape data 110 is illustrated. The shape data 110 is design data designed in the past using the three-dimensional CAD. The shape data 110 includes specific portions 111, 112, and 113. The specific portions 111, 112, and 113 are hole portions (through-hole that passes through shape data 110) of which center points $O_1$, $O_2$, and $O_3$ and radii $r_1$, $r_2$, and $r_3$ are defined.

The shape data 110 includes dimensional information 121, 122, and 123 of the specific portions 111, 112, and 113. The dimensional information 121 includes coordinates $(x_1, y_1, z_1)$ of the center point $O_1$ of the specific portion 111 and the radius $r_1$. The dimensional information 122 includes coordinates $(x_2, y_2, z_2)$ of the center point $O_2$ of the specific portion 112 and the radius $r_2$. The dimensional information 123 includes coordinates $(x_3, y_3, z_3)$ of the center point $O_3$ of the specific portion 113 and the radius $r_3$.

Here, the dimensional information 121, 122, and 123 does not include information regarding distances between the specific portions 111, 112, and 113 and another portion or the like. For example, it can be said that, in the shape data 110, a distance between each of the center points $O_1$, $O_2$, and $O_3$ of the specific portions 111, 112, and 113 and a straight line on the same plane is a dimension representing an intention of the designer.

In the shape data 110, the straight line on the same plane as each of the center points $O_1$, $O_2$, and $O_3$ includes, for example, straight lines 115 and 116 (straight-line edge portion) representing end portions of a plane 114. Therefore, for example, the information processing device 101 calculates a distance $b_1$ between the center point $O_1$ and the straight line 115 as the first distance, for the specific portion 111. Furthermore, for example, the information processing device 101 calculates a distance $c_1$ between the center point $O_1$ and the straight line 116 as the first distance, for the specific portion 111.

Furthermore, for example, the information processing device 101 calculates a distance $b_4$ $(b_1+b_2)$ between the center point $O_2$ and the straight line 115 as the first distance, for the specific portion 112. Furthermore, for example, the information processing device 101 calculates a distance $c_1$ between the center point $O_2$ and the straight line 116 as the first distance, for the specific portion 112.

Furthermore, for example, the information processing device 101 calculates a distance $b_5$ ($b_1+b_2+b_3$) between the center point $O_3$ and the straight line 115 as the first distance, for the specific portion 113. Furthermore, for example, the information processing device 101 calculates a distance $c_1$ between the center point $O_3$ and the straight line 116 as the first distance, for the specific portion 112.

Note that it can be said that, in the shape data 110, the distances between the specific portions 111, 112, and 113 and the center point are the dimensions representing the intention of the designer. Therefore, for example, the information processing device 101 may calculate a distance $b_2$ between the center point $O_1$ and another center point $O_2$ or a distance $b_3$ to $O_3$ as a second distance, for the specific portion 111. Furthermore, for example, the information processing device 101 may calculate a distance $b_1$ between the center point $O_2$ and another center point $O_1$ or the distance $b_3$ to $O_3$ as the second distance, for the specific portion 112. Furthermore, for example, the information processing device 101 may calculate a distance $b_2+b_3$ between the center point $O_3$ and another center point $O_1$ or the distance $b_3$ to $O_2$ as the second distance, for the specific portion 113.

(2) The information processing device 101 adds the calculated first distance to the dimensional information of the specific portion in each shape data. In the example in FIG. 1, regarding the specific portion 111, the information processing device 101 adds a calculated first distance 131 (distance $b_1$ and distance $c_1$) to the dimensional information 121.

Furthermore, regarding the specific portion 112, the information processing device 101 adds a calculated first distance 132 (distance $b_4$ and distance $c_1$) to the dimensional information 122. Furthermore, regarding the specific portion 113, the information processing device 101 adds a calculated first distance 133 (distance $b_5$ and distance $c_1$) to the dimensional information 123.

(3) The information processing device 101 specifies a dimensional relationship between the different portions in the shape data in the group, based on the dimensional information for each portion of each shape data in the group. The pieces of shape data classified into the same group have, for example, similar unit shape data (normalized shapes are substantially the same) and have portions corresponding to each other, respectively.

The information processing device 101 derives a relationship between a certain portion and another portion by a method such as regression analysis based on the dimensional information for each portion of each shape data in the group. For example, the information processing device 101 creates a relational expression indicating the dimensional relationship between the different portions, using one of the plurality of portions in each shape data as an objective variable and another portion as an explanatory variable.

In this way, according to the information processing device 101, it is possible to derive the dimensional relationship between the different portions in the shape data, by adding a new dimension (first distance) that is represented by the intention of the designer, regarding the specific portion in the shape data. Therefore, the information processing device 101 can construct a parametric model reflecting the design intent.

In the example in FIG. 1, the information processing device 101 can define the new dimensions (distances $b_1$, $b_4$, $b_5$, and $c_1$) representing positional relationships between the specific portions 111 to 113 that are hole portions in the shape data 110 and the straight lines 115 and 116 on the same plane 114. In this way, regarding the specific portions 111 to 113, the information processing device 101 can add the new dimension representing the intention of the designer and derive the dimensional relationship between the different portions in the shape data 110.

(System Configuration Example of Information Processing System 200)

Next, a system configuration example of an information processing system 200 including the information processing device 101 will be described. Here, a case will be described where the information processing device 101 illustrated in FIG. 1 is applied to a model generation device 201 in the information processing system 200 as an example. The information processing system 200 is applied to, for example, a computer system that supports design of 3D shapes regarding products and buildings.

In the following description, "3D (three-dimensional) shape data" will be described as an example of the shape data.

Figure 2:
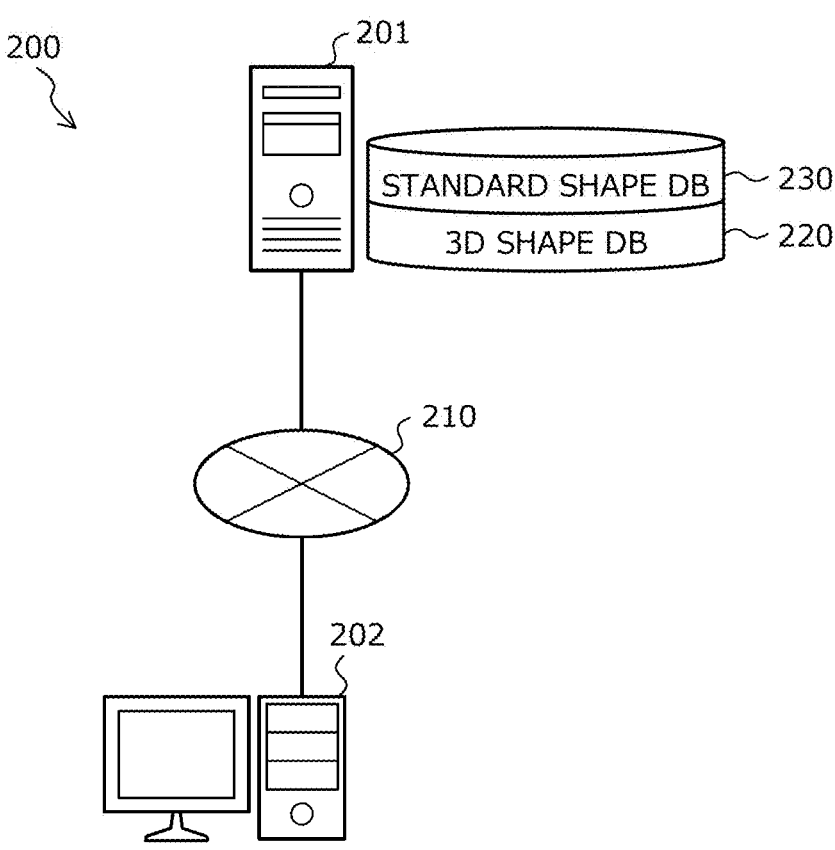
FIG. 2 is an explanatory diagram illustrating a system configuration example of an information processing system 200.

FIG. 2 is an explanatory diagram illustrating the system configuration example of the information processing system 200. In FIG. 2, the information processing system 200 includes the model generation device 201 and a client device 202. In the information processing system 200, the model generation device 201 and the client device 202 are coupled via a wired or wireless network 210. The network 210 is, for example, the Internet, a local area network (LAN), a wide area network (WAN), or the like.

Here, the model generation device 201 includes a 3D shape database (DB) 220 and a standard shape DB 230. The model generation device 201 is, for example, a server. The 3D shape DB 220 is a database that stores 3D shape data designed in the past. The standard shape DB 230 is a database that stores standard shape data. Content stored in the 3D shape DB 220 and the standard shape DB 230 will be described later with reference to FIGS. 4 and 5.

The client device 202 is a computer used by a user. The client device 202 is, for example, a personal computer (PC), a tablet PC, or the like. The user is, for example, a designer who designs an object.

Note that, in the example in FIG. 2, only one client device 202 is illustrated, but the number of client devices 202 is not limited to this. For example, the information processing system 200 may include the plurality of client devices 202. Furthermore, the model generation device 201 is provided separately from the client device 202. However, the present embodiment is not limited to this. For example, the model generation device 201 may be implemented by the client device 202.

(Hardware Configuration Example of Model Generation Device 201)

Figure 3:
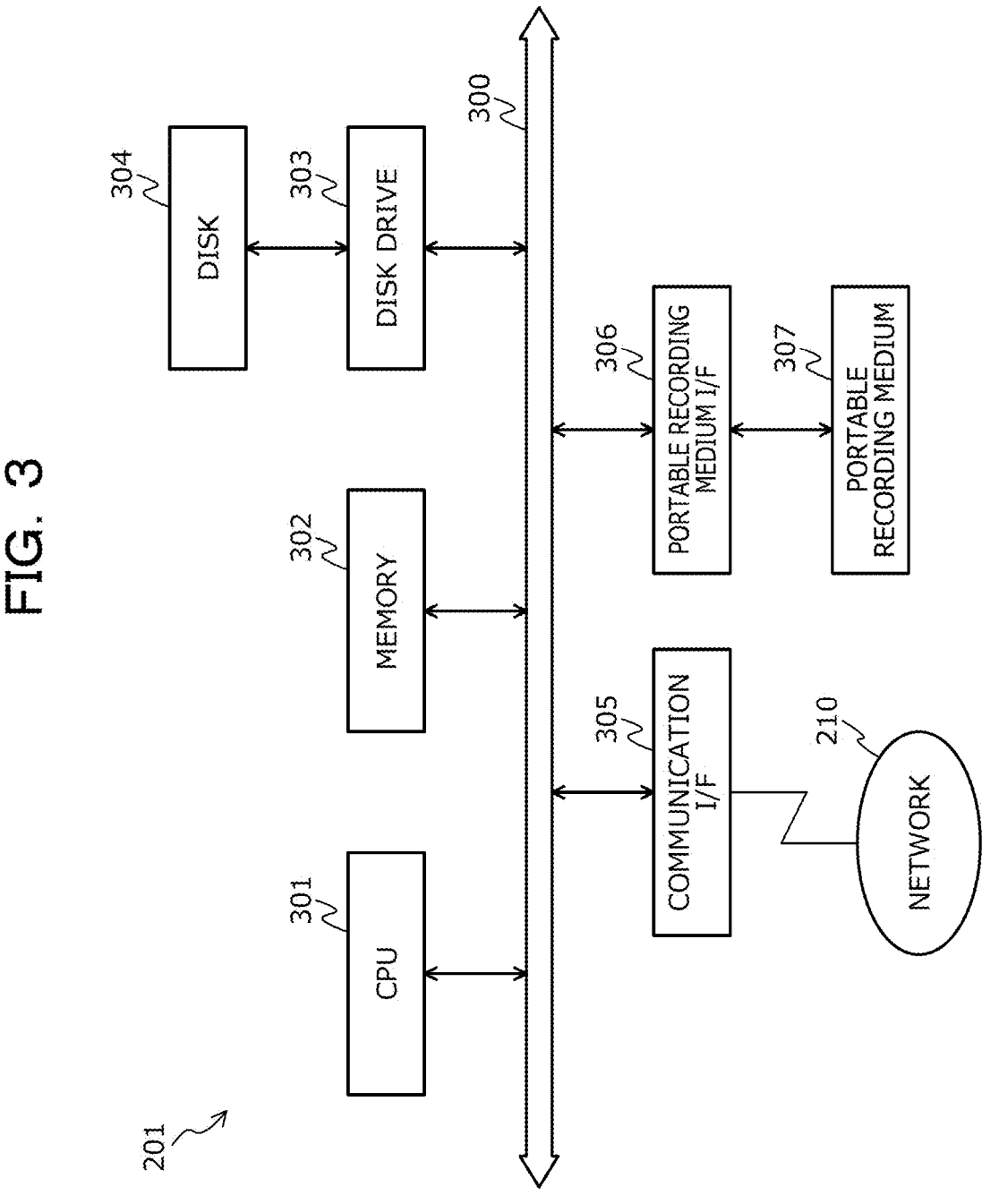
FIG. 3 is a block diagram illustrating a hardware configuration example of a model generation device 201.

FIG. 3 is a block diagram illustrating a hardware configuration example of the model generation device 201. In FIG. 3, the model generation device 201 includes a central processing unit (CPU) 301, a memory 302, a disk drive 303, a disk 304, a communication interface (I/F) 305, a portable recording medium I/F 306, and a portable recording medium 307. Furthermore, the components are coupled to each other by a bus 300.

Here, the CPU 301 performs overall control of the model generation device 201. The CPU 301 may include a plurality of cores. For example, the memory 302 includes a read only memory (ROM), a random access memory (RAM), a flash ROM, and the like. For example, the flash ROM stores an operating system (OS) program, the ROM stores an application program, and the RAM is used as a work area for the CPU 301. The programs stored in the memory 302 are loaded into the CPU 301 to cause the CPU 301 to execute coded processing.

The disk drive 303 controls reading/writing of data from/into the disk 304, under the control of the CPU 301. The disk 304 stores data written under the control of the disk drive 303. For example, the disk 304 is a magnetic disk, an optical disk, or the like.

The communication I/F 305 is coupled to the network 210 through a communication line and is coupled to an external computer (for example, client device 202 illustrated in FIG. 2) via the network 210. Then, the communication I/F 305 controls an interface between the network 210 and the inside of the device and controls input/output of data to/from the external computer. The communication I/F 305 is, for example, a modem, a LAN adapter, or the like.

The portable recording medium I/F 306 controls reading/writing of data from/into the portable recording medium 307, under the control of the CPU 301. The portable recording medium 307 stores data written under the control of the portable recording medium I/F 306. The portable recording medium 307 is, for example, a compact disc (CD)-ROM, a digital versatile disk (DVD), a universal serial bus (USB) memory, or the like.

Note that the model generation device 201 does not need to include, for example, the disk drive 303, the disk 304, the portable recording medium I/F 306, or the portable recording medium 307 among the above-described components. Furthermore, the model generation device 201 may include, for example, a display, an input device, or the like, in addition to the above-described components. Furthermore, also the client device 202 illustrated in FIG. 2 can be implemented by a hardware configuration similar to the hardware configuration of the model generation device 201. However, for example, the client device 202 includes an input device, a display, or the like, in addition to the components described above.

(Content Stored in Various DBs 220 and 230)

Next, content stored in various DBs 220 and 230 included in the model generation device 201 will be described with reference to FIGS. 4 and 5. The various DBs 220 and 230 are implemented, for example, by a storage device such as the memory 302 or the disk 304 illustrated in FIG. 3.

Figure 4:
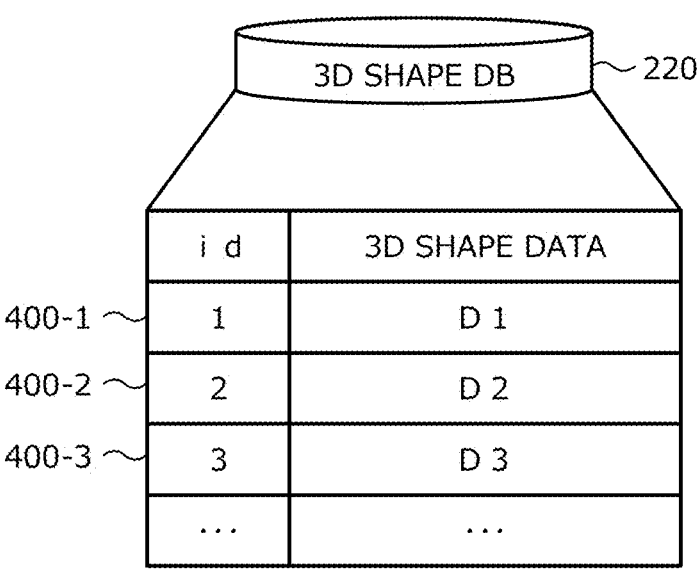
FIG. 4 is an explanatory diagram illustrating an example of content stored in a 3D shape DB 220.

FIG. 4 is an explanatory diagram illustrating an example of content stored in the 3D shape DB 220. In FIG. 4, the 3D shape DB 220 has fields for an id and 3D shape data, and stores 3D shape management information (for example, 3D shape management information 400-1 to 400-3) as records by setting information in each field.

Here, the id is an identifier used to uniquely identify the 3D shape data. The 3D shape data is 3D shape data designed in the past. Here, for convenience of description, the respective pieces of 3D shape data are described as "D1, D2, D3, . . . ". For example, the 3D shape management information 400-1 indicates the 3D shape data D1 with an id "1".

Figure 5:
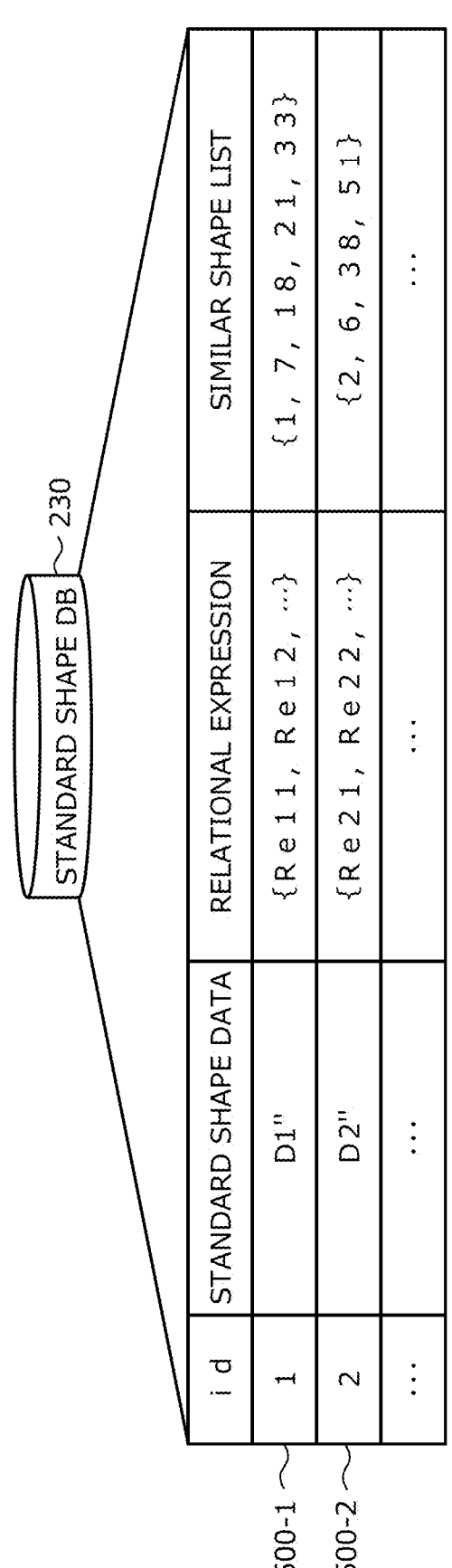
FIG. 5 is an explanatory diagram (part 1) illustrating an example of content stored in a standard shape DB 230.

FIG. 5 is an explanatory diagram (part 1) illustrating an example of content stored in the standard shape DB 230. In FIG. 5, the standard shape DB 230 has fields for an id, standard shape data, a relational expression, and a similar shape list, and stores standard shape management information (for example, standard shape management information 500-1 and 500-2) as records by setting information in each field.

Here, the id is an id of the 3D shape data that is a creation source of the standard shape data. The standard shape data is unit 3D shape data registered as standard shape data. The relational expression is a mathematical expression indicating a dimensional relationship between different portions (for example, sides) in the 3D shape data that is the creation source of the standard shape data. The relational expression may include a hole position model to be described later. The hole position model is a model that corresponds to a surface in the 3D shape data and represents a positional relationship between a plurality of hole portions on the surface.

Here, each Re ##represents a different mathematical expression (##is a number). Each mathematical expression indicates, for example, a dimensional relationship between different sides in the 3D shape data. The similar shape list is a list of the ids of the 3D shape data classified into the same group based on the standard shape data (unit 3D shape data).

For example, the standard shape management information 500-1 indicates standard shape data D1" corresponding to the 3D shape data D1 with the id "1", a relational expression $\{Re11, Re12, . . . \}$, and a similar shape list $\{1, 7, 18, 21, 33\}$. Note that a variable representing each portion in the standard shape data (unit 3D shape data) corresponds to a variable in the relational expression. As a result, which portion in the standard shape data (unit shape data) each variable included in the relational expression corresponds to is specifiable.

Furthermore, the standard shape management information may include dimensional information of a hole portion corresponding to the standard shape data (unit 3D shape data). The dimensional information of the hole portion corresponding to the standard shape data (unit 3D shape data) is the dimensional information of the hole portion deleted from the 3D shape data when the unit 3D shape data is created and is, for example, dimensional information of a hole portion of any one of the pieces of 3D shape data classified into the same group.

(Functional Configuration Example of Model Generation Device 201)

Next, a functional configuration example of the model generation device 201 will be described.

Figure 6:
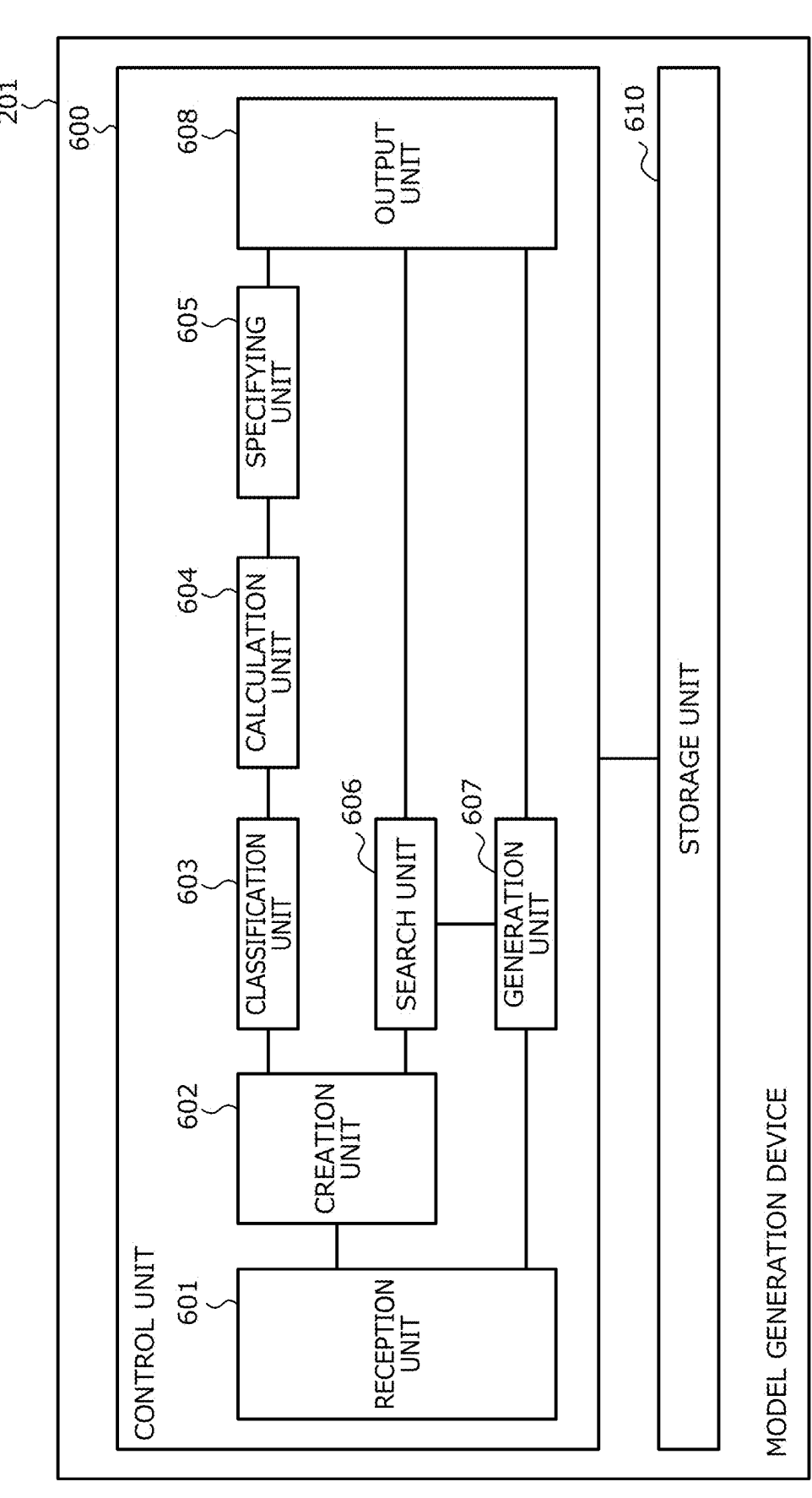
FIG. 6 is a block diagram illustrating a functional configuration example of the model generation device 201.

FIG. 6 is a block diagram illustrating the functional configuration example of the model generation device 201. In FIG. 6, the model generation device 201 includes a reception unit 601, a creation unit 602, a classification unit 603, a calculation unit 604, a specifying unit 605, a search unit 606, a generation unit 607, an output unit 608, and a storage unit 610. The reception unit 601 to the output unit 608 have functions serving as a control unit 600, and for example, those functions are implemented by causing the CPU 301 to execute the program stored in the storage device such as the memory 302, the disk 304, or the portable recording medium 307 illustrated in FIG. 3, or by the communication I/F 305. A processing result of each functional unit is stored, for example, in the storage device such as the memory 302 or the disk 304. Furthermore, the storage unit 610 is implemented by the storage device such as the memory 302 or the disk 304, for example. For example, the storage unit 610 stores the 3D shape DB 220 illustrated in FIG. 4 and the standard shape DB 230 illustrated in FIG. 5.

The reception unit 601 receives designation of target 3D shape data. The target 3D shape data is, for example, 3D shape data for designating design intent for an object. The target 3D shape data includes a specific portion of which a center point is defined. The specific portion is, for example, a curve portion or a hole portion.

The curve portion is a portion of which a center point, a radius, a center angle, and an end point are defined and is, for example, an arc-shaped edge portion (end portion of surface). The center angle is an angle formed by a line segment connecting one end point of the curve portion and the center point and a line segment connecting another end point and the center point. The end point of the arc-shaped edge portion may be specified from the center point, the radius, and the center angle.

The hole portion is a portion of which a center point and a radius are defined and is, for example, a through-hole that passes through 3D shape data or a recessed hole on the 3D shape data. Here, a case is assumed where a cross-sectional shape of the hole portion is circular. Note that, in a case where the cross-sectional shape of the hole portion is a rectangle (square, rectangle, or the like), for example, a length of a diagonal line is defined instead of the radius.

The target 3D shape data is designated from among the pieces of 3D shape data stored in the 3D shape DB 220, for example. Furthermore, the target 3D shape data may be 3D shape data in a state where basic design (designed with rough dimensions) for the object is completed.

For example, the reception unit 601 receives designation of the target 3D shape data by receiving designation of the id of any piece of the 3D shape data stored in the 3D shape DB 220 from the client device 202. Furthermore, the reception unit 601 may receive the target 3D shape data itself, from the client device 202.

The creation unit 602 generates the unit 3D shape data for each 3D shape data of the plurality of pieces of 3D shape data. The plurality of pieces of 3D shape data is, for example, the 3D shape data stored in the 3D shape DB 220. Each 3D shape data of the plurality of pieces of 3D shape data includes, for example, the specific portion (for example, curve portion or hole portion) of which the center point is defined.

For example, the creation unit 602 deletes the dimensional information of the hole portion out of the specific portions, from each 3D shape data of the plurality of pieces of 3D shape data. Then, the creation unit 602 normalizes each 3D shape data of the plurality of pieces of 3D shape data after the dimensional information of the hole portion has been deleted for each component in each coordinate axis direction and creates the unit 3D shape data.

In the following description, the 3D shape data after the dimensional information of the hole portion has been deleted may be referred to as "3D shape data (after deletion)".

For example, the creation unit 602 extracts a minimum value in each coordinate axis direction from coordinates of each characteristic point of each piece of the 3D shape data (after deletion). The characteristic point is, for example, a vertex of a design object. Then, the creation unit 602 subtracts the extracted minimum value in each coordinate axis direction from each value of the coordinates of each characteristic point.

Next, the creation unit 602 extracts a maximum value in each coordinate axis direction from the coordinates of each characteristic point after the subtraction. Then, the creation unit 602 creates the unit 3D shape data of each 3D shape data (after deletion) by dividing each value of the coordinates of each characteristic point after the subtraction by the extracted maximum value in each coordinate axis direction.

Here, a creation example of the unit 3D shape data will be described with reference to FIG. 7. In the following description, any one of the plurality of pieces of 3D shape data may be referred to as "3D shape data Di" (where i is natural number of one or larger).

Figure 7:
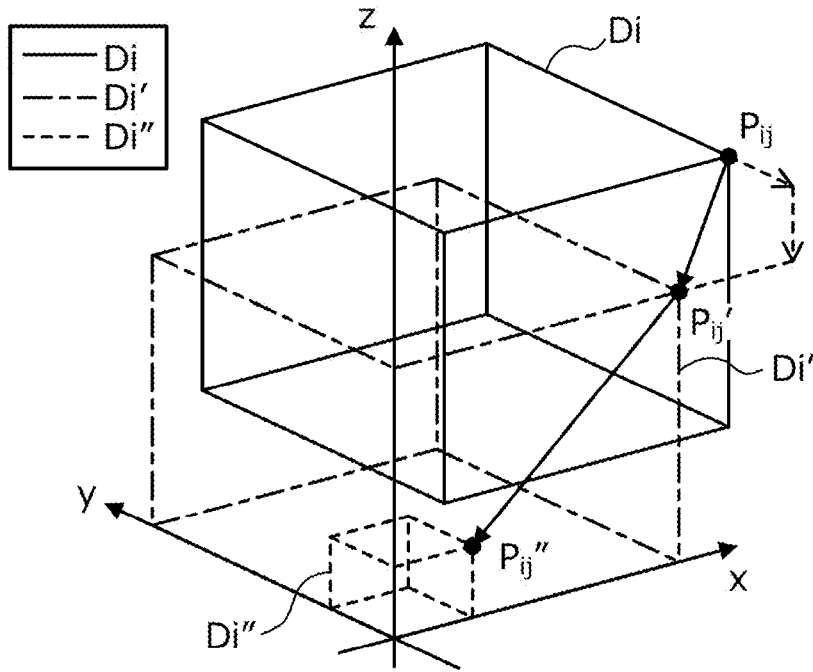
FIG. 7 is an explanatory diagram illustrating a creation example of unit 3D shape data.

FIG. 7 is an explanatory diagram illustrating the creation example of the unit 3D shape data. In FIG. 7, coordinates of each vertex j of the 3D shape data (after deletion) Di (solid line in FIG. 7) are set as $P_{ij}$ ($x_{ij}$, $y_{ij}$, $z_{ij}$) (j=1, 2, . . . , J). Here, a case where the 3D shape data (after deletion) Di is a "rectangular parallelepiped" will be described as an example.

First, the creation unit 602 extracts the minimum value in each coordinate axis direction from the coordinates of each vertex j of the 3D shape data (after deletion) Di. Then, the creation unit 602 translates the 3D shape data (after deletion) Di by subtracting the extracted minimum value in each coordinate axis direction from each value of the coordinates $P_{ij}$ of each vertex j. New 3D shape data (after deletion) (one-dot chain line in FIG. 7) obtained here is set as "Di'", and coordinates of each vertex are set as $P_{ij}'$ ($x_{ij}'$, $y_{ij}'$, $z_{ij}'$).

The coordinates $x_{ij}'$, $y_{ij}'$, and $z_{ij}'$ are expressed by the following formulas (1) to (3): where "i, j, J∈ natural number" and "$x_{ij}$, $y_{ij}$, $z_{ij}$>0".

$$x_{ij}' = x_{ij} - \text{Min}([x_{i1}, x_{i2}, \dots , x_{iJ}]) \tag{1}$$

$$y_{ij}' = y_{ij} - \text{Min}([y_{i1}, y_{i2}, \dots , y_{iJ}]) \tag{2}$$

$$z_{ij}' = z_{ij} - \text{Min}([z_{i1}, z_{i2}, \dots , z_{iJ}]) \tag{3}$$

Next, the creation unit 602 extracts the maximum value in each coordinate axis direction from the coordinates $P_{ij}'$ of each vertex. Then, the creation unit 602 divides each value of the coordinates $P_{ij}'$ of each vertex by the extracted maximum value in each coordinate axis direction to create the normalized unit 3D shape data. The unit 3D shape data obtained here is set as "Di''"(dotted line in FIG. 7), and coordinates of each vertex are set as $P_{ij}''$ ($x_{ij}''$, $y_{ij}''$, $z_{ij}''$).

The coordinates $x_{ij}''$, $y_{ij}''$, and $z_{ij}''$ are expressed by the following formulas (4) to (6).

$$x_{ij}'' = x_{ij}'/\text{Max}([x_{i1}', x_{i2}', \dots , x_{iJ}']) \tag{4}$$

$$y_{ij}'' = y_{ij}'/\text{Max}([y_{i1}', y_{i2}', \dots , y_{iJ}']) \tag{5}$$

$$z_{ij}'' = z_{ij}'/\text{Max}([z_{i1}', z_{i2}', \dots , z_{iJ}']) \tag{6}$$

Note that, in the 3D shape data (after deletion), only the center point in the dimensional information of the hole portion may be included as the characteristic point. In this case, the creation unit 602 can create the unit 3D shape data that expresses the center point of the hole portion, from the 3D shape data (after deletion).

Returning to the description of FIG. 6, the classification unit 603 classifies a plurality of pieces of 3D shape data based on the created unit 3D shape data of each piece of the 3D shape data (after deletion). Each 3D shape data of the plurality of pieces of 3D shape data to be classified is 3D shape data corresponding to the 3D shape data (after deletion).

For example, the classification unit 603 calculates a similarity between the pieces of unit 3D shape data of the respective pieces of 3D shape data. Next, the classification unit 603 specifies a combination of the pieces of unit 3D shape data of which the calculated similarity is equal to or more than a threshold. Then, the classification unit 603 classifies the plurality of pieces of 3D shape data such that pieces of the 3D shape data corresponding to the respective pieces of unit 3D shape data included in the specified combination of the pieces of unit 3D shape data belong to the same group. The threshold can be arbitrarily set. For example, the threshold value is set to a value in which the pieces of unit 3D shape data can be determined to match each other if the similarity is equal to or larger than the threshold.

For example, the classification unit 603 compares the unit 3D shape data of the designated target 3D shape data with the unit 3D shape data of each 3D shape data in the 3D shape DB 220, and calculates the similarity between the pieces of unit 3D shape data. The unit 3D shape data of the target 3D shape data is created after the dimensional information of the hole portion has been deleted.

Each piece of the 3D shape data in the 3D shape DB 220 to be compared is, for example, 3D shape data including a specific portion (for example, curve portion or hole portion). Furthermore, each piece of the 3D shape data in the 3D shape DB 220 to be compared may be, for example, 3D shape data having hole portions as many as the hole portions of the target 3D shape data. The classification unit 603 may select the 3D shape data having the hole portions as many as the hole portions of the target 3D shape data, from the 3D shape DB 220.

For example, the classification unit 603 compares images obtained by imaging each unit 3D shape data from a plurality of directions between the pieces of unit 3D shape data, and calculates a similarity between the images. Any existing technique may be used to calculate the similarity between the images.

Next, the classification unit 603 calculates the similarity between the pieces of unit 3D shape data by accumulating the calculated similarity between the images. Then, the classification unit 603 classifies the 3D shape data corresponding to the combination of the pieces of unit 3D shape data of which the calculated similarity is equal to or larger than the threshold, into the same group. As a result, 3D shape data having similar unit 3D shape data to the target 3D shape data can be extracted from the 3D shape DB 220.

Here, a classification example of the 3D shape data will be described with reference to FIG. 8.

Figure 8:
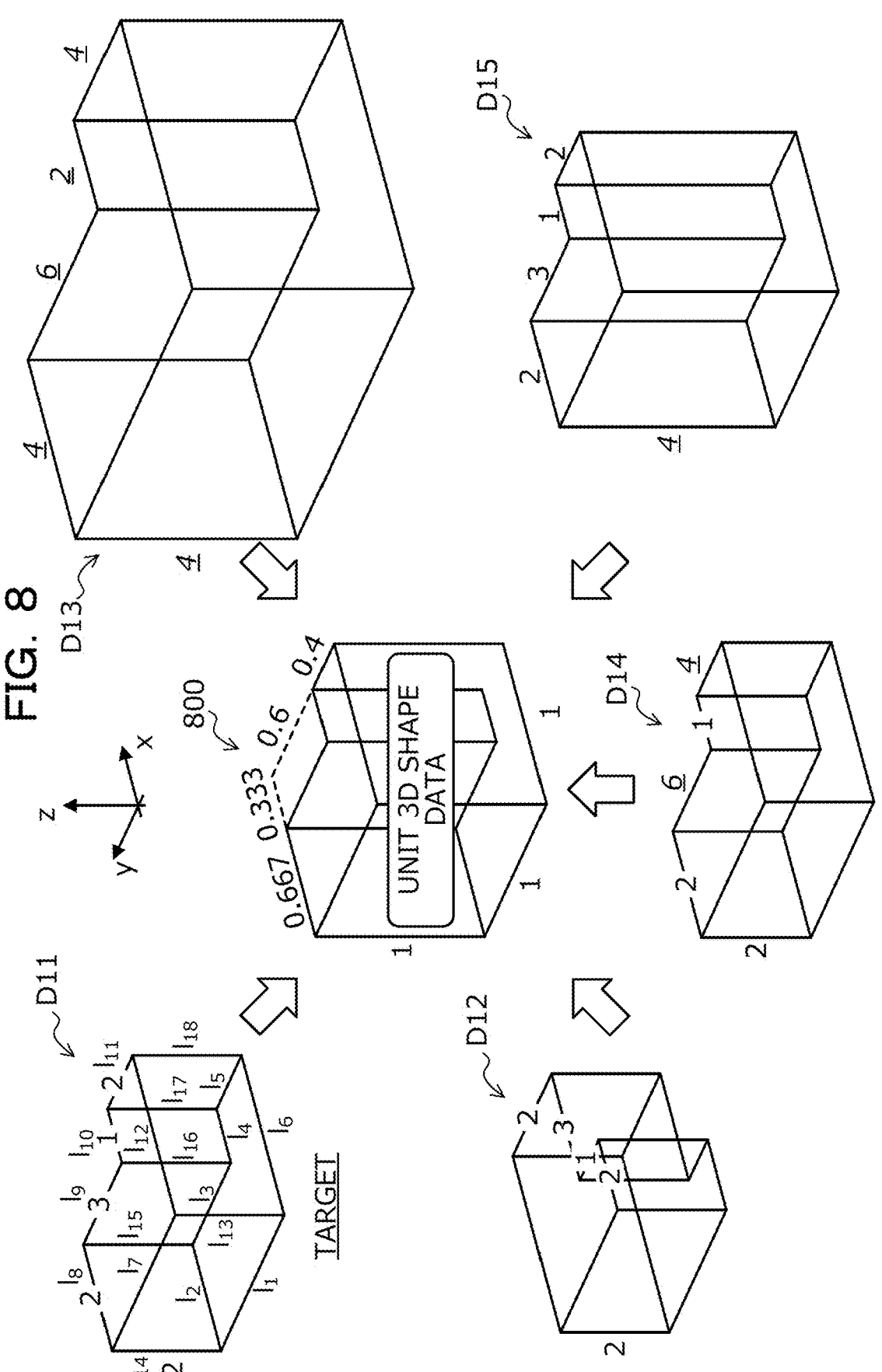
FIG. 8 is an explanatory diagram illustrating a classification example of 3D shape data.

FIG. 8 is an explanatory diagram illustrating the classification example of the 3D shape data. In FIG. 8, pieces of 3D shape data D11 to D15 are displayed. However, in FIG. 8, the pieces of 3D shape data D11 to D15 are displayed in a state where the specific portion (for example, curve portion or hole portion) has been deleted.

The 3D shape data D11 is target 3D shape data. The 3D shape data D12 is 3D shape data in a direction different from the target 3D shape data D11. The 3D shape data D13 is 3D shape data having a similarity relationship with the target 3D shape data D11. The pieces of 3D shape data D14 and D15 are 3D shape data of which some lengths are different from the target 3D shape data D11. In FIGS. 8, $I_1$ to $I_{18}$ in the 3D shape data D11 indicate sides in the 3D shape data D11. Furthermore, numerical values in each of the pieces of 3D shape data D11 to D15 indicate dimensions of the respective sides.

Here, each of the pieces of 3D shape data D11 to D15 is normalized for each component in each coordinate axis direction as described in FIG. 7, pieces of unit 3D shape data 800 (corresponding to 3D shape data D11" to D15") having the same shape are created, respectively. In this case, the pieces of 3D shape data D11 to D15 are classified into the same group.

In this way, by determining the similarity based on the unit 3D shape data (parametric relationship), it is possible to classify those with the same side ratio in each coordinate axis direction, and not only the same shape as or similar shape to the target but also shapes having some different lengths can be classified into the same group.

The calculation unit 604 calculates the first distance for the specific portion of which the center point is defined, among the plurality of portions included in the shape indicated by each 3D shape data in the classified group. Then, the calculation unit 604 adds the calculated first distance to the dimensional information of the specific portion in each 3D shape data. Here, the first distance is a distance between a straight line on the same plane as the center point of the specific portion in each 3D shape data and the center point. The straight line on the same plane is, for example, a straight-line edge portion.

For example, it is assumed that the specific portion be an arc-shaped edge portion (curve portion). For the arc-shaped edge portion, for example, a center point, a radius, a center angle, and an end point are defined. In this case, the calculation unit 604 calculates a distance (first distance) between the center point of the arc-shaped edge portion and the straight line on the same plane as the center point, in the 3D shape data.

The distance to the center point of the arc-shaped edge portion may be calculated, for example, for all straight lines on the same plane. Furthermore, the distance to the center point of the arc-shaped edge portion may be calculated for a straight line closest to the center point among the straight lines on the same plane. Then, the calculation unit 604 adds the calculated first distance to the dimensional information of the arc-shaped edge portion in the 3D shape data.

Here, a calculation example of the first distance of the arc-shaped edge portion will be described with reference to FIG. 9.

Figure 9:
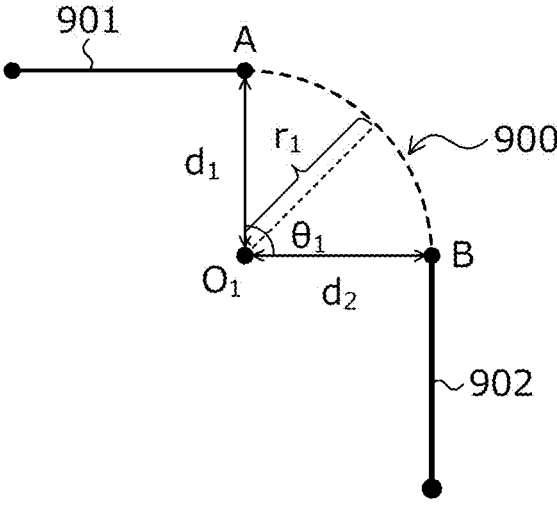
FIG. 9 is an explanatory diagram illustrating an example of an arc-shaped edge portion.

FIG. 9 is an explanatory diagram illustrating an example of the arc-shaped edge portion. In FIG. 9, an arc-shaped edge portion 900 is an example of the specific portion in the 3D shape data. For the arc-shaped edge portion 900, a center point $O_1$, a radius $r_1$, a center angle $\theta_1$, and end points A and B are defined.

First, the calculation unit 604 specifies two straight lines 901 and 902 adjacent to the center point $O_1$ from the 3D shape data. Next, the calculation unit 604 determines whether or not four end points of the specified straight lines 901 and 902 are on the same plane. Here, in a case where the four end points are on the same plane, the calculation unit 604 determines whether or not the center point $O_1$ is on the plane.

Here, in a case where the center point $O_1$ is on the plane, the calculation unit 604 determines that the straight lines 901 and 902 are on the same plane as the center point $O_1$. In this case, the calculation unit 604 calculates distances (shortest distance) $d_1$ and $d_2$ between the center point $O_1$ of the arc-shaped edge portion 900 and the respective straight lines 901 and 902, as the first distance.

Furthermore, it is assumed that the specific portion be a hole portion. The hole portion is a through-hole that passes through the 3D shape data or a recessed hole on the 3D shape data. For the hole portion, for example, a center point and a radius are defined. In this case, the calculation unit 604 calculates a distance (first distance) between the center point of the hole portion and a straight line on the same plane as the center point, in the 3D shape data.

The distance to the center point of the hole portion may be calculated, for example, for all straight lines on the same plane. Furthermore, the distance to the center point of the hole portion may be calculated for a straight line closest to the center point among the straight lines on the same plane.

Then, the calculation unit 604 adds the calculated first distance to the dimensional information of the hole portion in the 3D shape data.

Furthermore, in a case where the specific portion is the hole portion, the calculation unit 604 may further calculate a distance (second distance) between the center point of the hole portion and a center point of another hole portion on the same plane as the center point in the 3D shape data. Then, the calculation unit 604 may add the calculated second distance to the dimensional information of the hole portion in the 3D shape data.

Here, a calculation example of the first and the second distances of the hole portion will be described with reference to FIGS. 10A and 10B.

Figure 10A:
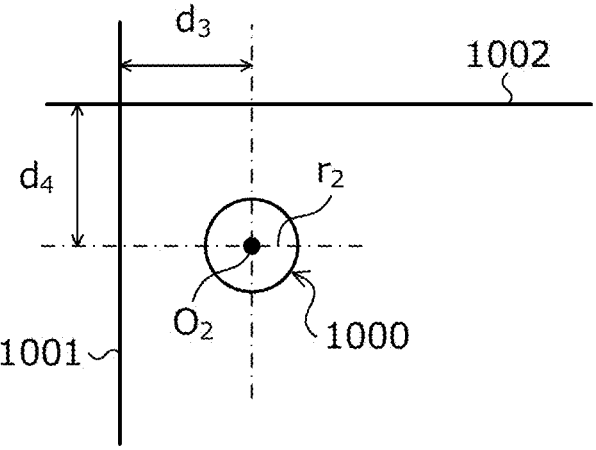
FIG. 10A is an explanatory diagram (part 1) illustrating an example of a hole portion.

FIG. 10A is an explanatory diagram (part 1) illustrating an example of the hole portion. In FIG. 10A, a hole portion 1000 is an example of the specific portion in the 3D shape data. For the hole portion 1000, the center point $O_2$ and the radius $r_2$ are defined. Straight lines 1001 and 1002 are straight lines on the same plane as the center point $O_2$ of the hole portion 1000.

In this case, the calculation unit 604 calculates distances (shortest distance) $d_3$ and $d_4$ between the center point $O_2$ of the hole portion 1000 and the respective straight lines 1001 and 1002 as the first distance.

Figure 10B:
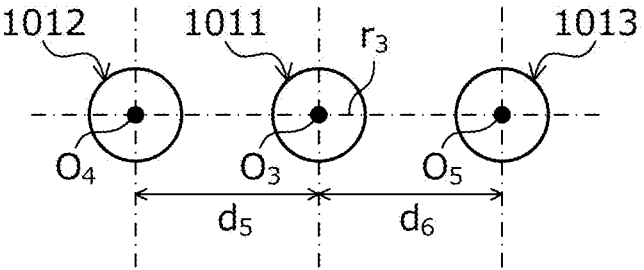
FIG. 10B is an explanatory diagram (part 2) illustrating an example of the hole portion.

FIG. 10B is an explanatory diagram (part 2) illustrating an example of the hole portion. In FIG. 10B, a hole portion 1011 is an example of the specific portion in the 3D shape data. For the hole portion 1011, the center point $O_3$ and the radius $r_3$ are defined. Center points $O_4$ and $O_5$ are center points of other hole portions 1012 and 1013 on the same plane as the center point $O_3$ of the hole portion 1011.

In this case, the calculation unit 604 calculates distances $d_5$ and $d_6$ between the center point $O_3$ of the hole portion 1000 and the center points $O_4$ and $O_5$ of the other hole portions 1012 and 1013, as the second distance.

Returning to the description of FIG. 6, the specifying unit 605 specifies the dimensional relationship between the different portions of the 3D shape data in the group based on the dimensional information for each portion of each of pieces of the 3D shape data in the classified group. Here, the portion of the 3D shape data is, for example, the side, the surface, the arc-shaped edge portion, the hole portion, or the like.

Dimensional information of the portion "side" includes, for example, an attribute "straight line", coordinates of an end point, and a length. Furthermore, dimensional information of the portion "surface" includes, for example, an attribute "surface", coordinates of a vertex, and a side. Furthermore, dimensional information of the portion "hole portion" includes, for example, an attribute "curve", coordinates of a center point, and a radius. Furthermore, dimensional information of the portion "hole portion" includes the added first distance and second distance. Furthermore, dimensional information of the portion "arc-shaped edge portion" includes, for example, an attribute "curve", coordinates of a center point, a radius, a center angle, and coordinates of an end point. Furthermore, the dimensional information of the portion "arc-shaped edge portion" includes the added first distance.

For example, the specifying unit 605 creates a vector having the dimension in each 3D shape data of the portion as an element, for each portion in each 3D shape data in the group. The dimension of each portion is specified from the dimensional information. Then, the specifying unit 605 creates a relational expression indicating a dimensional relationship between different portions based on the created vector for each portion, using one of the plurality of portions in each 3D shape data as an objective variable and another portion as an explanatory variable. The dimensional relationship between the different portions can be constructed by, for example, a method such as linear regression analysis, non-linear regression analysis, or machine learning using a neural network.

Furthermore, the specifying unit 605 may set a portion having a relatively high variance of the elements of the created vector as the objective variable among the plurality of portions in each 3D shape data. As a result, the relational expression can be constructed excluding a portion with an unchanged dimension among the pieces of 3D shape data in the group from the objective variable. Note that a correlation coefficient between variables may be obtained and the variables having a relatively low correlation may be excluded.

Furthermore, the specifying unit 605 may set a portion having a relatively high contribution rate to the objective variable as the explanatory variable, among the plurality of portions in each 3D shape data. The contribution rate (coefficient of determination) is a value representing how much the explanatory variable can explain the objective variable. For example, when constructing the relational expression, the specifying unit 605 may select a variable having a high contribution rate to the objective variable as the explanatory variable by a stepwise method.

Here, when specifying the correspondence relationship of the portions between the pieces of 3D shape data classified into the same group, for example, the specifying unit 605 makes directions of the x axis, the y axis, and the z axis match and aligns the x axis, the y axis, and the z axis regarding the unit 3D shape data of each 3D shape data. Then, the specifying unit 605 may align the directions of the respective pieces of 3D shape data in the group based on the aligned unit 3D shape data and specify the corresponding portion between the pieces of 3D shape data.

About processing for specifying the correspondence relationship of the portions between the pieces of 3D shape data in the group, for example, related art 2 (Japanese Patent Application Laid-Open No. 2022-168686) can be referred.

For example, the specifying unit 605 specifies a second portion in second 3D shape data corresponding to a first portion in first 3D shape data. Here, the first 3D shape data and the second 3D shape data are 3D shape data in the classified group. The first 3D shape data is, for example, the target 3D shape data.

The second 3D shape data is another piece of 3D shape data different from the first 3D shape data in the classified group. The first portion is a partial shape (portion) represented by the first 3D shape data. The second portion is a partial shape (portion) represented by the second 3D shape data. Each portion is, for example, a side, a hole portion, an arc-shaped edge portion, or the like.

For example, the specifying unit 605 specifies the portion (second portion) of the second 3D shape data corresponding to the portion (first portion) of the first 3D shape data, for each portion (first portion) of the first 3D shape data.

For example, the specifying unit 605 acquires third unit 3D shape data and fourth unit 3D shape data, for each of the first 3D shape data and the second 3D shape data. Here, the third unit 3D shape data is, for example, unit 3D shape data created by normalizing the first 3D shape data for each component in each coordinate axis direction. The fourth unit 3D shape data is, for example, unit 3D shape data created by normalizing the second 3D shape data for each component in each coordinate axis direction.

However, the third unit 3D shape data may be created based on 3D shape data in which information other than the center point of the dimensional information of the hole portion has been deleted from the first 3D shape data. Similarly, the fourth unit 3D shape data may be created based on 3D shape data in which information other than the center point of the dimensional information of the hole portion has been deleted from the second 3D shape data. As a result, the specifying unit 605 can create the unit 3D shape data while deleting an outer part of the hole portion and leaving the center point of the hole portion as the characteristic point.

Next, the specifying unit 605 generates a plurality of first images and a plurality of second images obtained by respectively imaging the third unit 3D shape data and the fourth unit 3D shape data from both directions of each of a plurality of axes. Here, the plurality of first images is, for example, a set of 2D images obtained by imaging the third unit 3D shape data from both directions of each of the x axis, the y axis, and the z axis. Furthermore, the plurality of second images is, for example, a set of 2D images obtained by imaging the fourth unit 3D shape data from both directions of each of the x axis, the y axis, and the z axis.

In the following description, a set of drawings including six images (2D image) obtained by imaging 3D shape data from positive and negative directions of each of the x axis, the y axis, and the z axis may be referred to as "six-sided view". One of the surfaces of the six-sided view corresponds to any one of the images obtained by imaging the 3D shape data from the positive and negative directions of each of the x axis, the y axis, and the z axis.

For example, the specifying unit 605 generates the plurality of first images, by generating an image imaged from each direction by rotating the third unit 3D shape data by a predetermined angle α around the axis, for each of the both directions (positive and negative directions) of each of the x axis, the y axis, and the z axis. The predetermined angle α can be arbitrarily set, and for example, set to a value such as 45 degrees, 90 degrees, or 180 degrees.

Furthermore, the specifying unit 605 generates the plurality of second images, by generating an image imaged from each direction by rotating the fourth unit 3D shape data by the predetermined angle α around the axis, for each of the both directions (positive and negative directions) of each of the x axis, the y axis, and the z axis.

For example, in a case where the 3D shape data (third unit 3D shape data and fourth unit 3D shape data) is rotated by 90 degrees around the axis and imaged from each direction, for each of the positive and the negative directions of each of the x axis, the y axis, and the z axis, 24 (6×4) images are generated.

Then, the specifying unit 605 specifies the second portion of the second 3D shape data corresponding to the first portion of the first 3D shape data, by aligning the directions of the first 3D shape data and the second 3D shape data, based on the comparison result between the plurality of first images and the plurality of second images.

Here, the directions of the first 3D shape data and the second 3D shape data are aligned, for example, by aligning the directions of the third unit 3D shape data and the fourth unit 3D shape data. A method for aligning the directions of the third unit 3D shape data and the fourth unit 3D shape data (methods 1 to 3) based on the comparison result between the plurality of first images and the plurality of second images will be described later.

Furthermore, the specifying unit 605 specifies a correspondence relationship between portions of the third unit 3D shape data and the fourth unit 3D shape data, by aligning the directions of the third unit 3D shape data and the fourth unit 3D shape data. For example, each portion of each unit 3D shape data is set as a side. The arc-shaped edge portion may be used as a side. Furthermore, each side is represented by a vector having a start point ($x_{start}$, $y_{start}$, $z_{start}$) and an end point ($x_{end}$, $y_{end}$, $z_{end}$) of each portion in a three-dimensional space as elements.

In this case, the specifying unit 605 compares a vector of each side of the third unit 3D shape data with a vector of each side of the fourth unit 3D shape data and calculates a distance between the vectors. Then, the specifying unit 605 specifies a side having the closest calculated distance among the sides of the fourth unit 3D shape data as a side corresponding to the side of the third unit 3D shape data, for each side of the third unit 3D shape data. As a result, a correspondence relationship between the side of the third unit 3D shape data and the side of the fourth unit 3D shape data can be specified.

Furthermore, each portion of each unit 3D shape data is set as a hole portion. Furthermore, each hole portion is represented by a vector having coordinates of the center point of each hole portion as an element. In this case, the specifying unit 605 compares a vector of each hole portion of the third unit 3D shape data with a vector of each hole portion of the fourth unit 3D shape data and calculates a distance between the vectors.

Then, the specifying unit 605 specifies a hole portion having the closest calculated distance, among the hole portions of the fourth unit 3D shape data, for each hole portion of the third unit 3D shape data as a hole portion corresponding to the hole portion of the third unit 3D shape data. As a result, a correspondence relationship between the hole portion of the third unit 3D shape data and the hole portion of the fourth unit 3D shape data can be specified.

Here, a correspondence relationship between the portions of the first 3D shape data and the third unit 3D shape data can be specified, for example, by associating corresponding portions before and after conversion. Furthermore, a correspondence relationship between the portions of the second 3D shape data and the fourth unit 3D shape data can be specified, for example, by associating corresponding portions before and after conversion.

Therefore, the specifying unit 605 can specify the second portion of the second 3D shape data corresponding to the first portion of the first 3D shape data, from the correspondence relationship between the portions of the third unit 3D shape data and the fourth unit 3D shape data. For example, the specifying unit 605 identifies the same place between the pieces of 3D shape data before being converted, from the correspondence relationship between the portions of the third unit 3D shape data and the fourth unit 3D shape data.

In this way, if the directions of the third unit 3D shape data and the fourth unit 3D shape data can be aligned, the specifying unit 605 can specify the second portion of the second 3D shape data corresponding to the first portion of the first 3D shape data.

Here, the method for aligning the directions of the third unit 3D shape data and the fourth unit 3D shape data (methods 1 to 3) based on the comparison result between the plurality of first images and the plurality of second images will be described.

First, the method 1 for aligning the directions of the third unit 3D shape data and the fourth unit 3D shape data based on the comparison result between the plurality of first images and the plurality of second images will be described.

The specifying unit 605 compares each of the plurality of first images with each of the plurality of second images and calculates a similarity between the images. The similarity between the images is calculated, for example, based on a feature amount of each image. Next, the specifying unit 605 specifies a correspondence relationship between an image included in the plurality of first images and an image included in the plurality of second images, based on the calculated similarity between the images. Then, the specifying unit 605 aligns the directions of the third unit 3D shape data and the fourth unit 3D shape data, based on the specified correspondence relationship.

For example, the specifying unit 605 calculates a similarity between images in a round-robin manner, between the third unit 3D shape data and the fourth unit 3D shape data, using the plurality of first images (for example, 24 images) and the plurality of second images (for example, 24 images). Then, the specifying unit 605 acquires information used to specify the directions of the third unit 3D shape data and the fourth unit 3D shape data, by specifying top three image pairs (surface) having the high calculated similarity.

As a result, the specifying unit 605 can align the directions of the first 3D shape data and the second 3D shape data and specify the second portion of the second 3D shape data corresponding to the first portion of the first 3D shape data.

Next, the method 2 for aligning the directions of the third unit 3D shape data and the fourth unit 3D shape data based on the comparison result between the plurality of first images and the plurality of second images will be described.

The specifying unit 605 selects a first reference image from among the plurality of first images. Here, the reference image is an image to be a reference when the plurality of first images and the plurality of second images are compared, in consideration of an arrangement pattern of each image (surface) in the six-sided view and is, for example, an image with the largest feature among the plurality of first images.

Next, the specifying unit 605 specifies a second reference image from among the plurality of second images, based on the comparison results between the selected first reference image with each of the plurality of second images. For example, the specifying unit 605 specifies an image having the highest similarity to the first reference image as the second reference image, from among the plurality of second images.

Next, the specifying unit 605 specifies a combination (referred to as "first combination") of images obtained by imaging the third unit 3D shape data when the first reference image, among the plurality of first images, is imaged from other directions different from a direction in which the first reference image is imaged. The first combination is, for example, a combination of images obtained by performing imaging from each of other directions adjacent to the direction in which the first reference image is imaged.

As an example, when the direction in which the first reference image is imaged is set as the negative direction of the x axis, the other directions adjacent to that direction include four directions at the maximum including the positive and negative directions of the y axis and the positive and negative directions of the z axis. For example, the first combination is a combination of images respectively corresponding to four surfaces adjacent to a surface corresponding to the first reference image. However, the first combination may be an image of at least one surface among the four surfaces adjacent to the surface corresponding to the first reference image.

Furthermore, the specifying unit 605 specifies a combination (referred to as "second combination") of images obtained by imaging the fourth unit 3D shape data when the second reference image, among the plurality of second images, is imaged from other directions different from a direction in which the second reference image is imaged. The second combination is, for example, a combination of images obtained by performing imaging from each of other directions adjacent to the direction in which the second reference image is imaged.

As an example, when the direction in which the second reference image is imaged is set as the negative direction of the x axis, the other directions adjacent to that direction include four directions at the maximum including the positive and negative directions of the y axis and the positive and negative directions of the z axis. For example, the second combination is a combination of images respectively corresponding to four surfaces adjacent to a surface corresponding to the second reference image. However, the second combination may be an image of at least one surface among the four surfaces adjacent to the surface corresponding to the second reference image.

Then, the specifying unit 605 aligns the directions of the third unit 3D shape data and the fourth unit 3D shape data, based on the comparison result between the images of the specified first combination and the images of the specified second combination. In this way, in the method 2, for example, after specifying the surface (reference image) having the largest feature, the specifying unit 605 aligns the directions of the third unit 3D shape data and the fourth unit 3D shape data with the four surfaces adjacent to that surface.

As a result, the specifying unit 605 can align the directions of the first 3D shape data and the second 3D shape data and specify the second portion of the second 3D shape data corresponding to the first portion of the first 3D shape data.

Next, the method 3 for aligning the directions of the third unit 3D shape data and the fourth unit 3D shape data based on the comparison result between the plurality of first images and the plurality of second images will be described.

The specifying unit 605 specifies a combination (hereinafter, referred to as "third combination") of images obtained by imaging the third unit 3D shape data from both directions of each of the plurality of axes, by fixing the third unit 3D shape data, from the plurality of first images. Furthermore, the specifying unit 605 specifies each combination (hereinafter, referred to as "fourth combination") of images obtained by imaging the fourth unit 3D shape data from both directions of each of the plurality of axes, for each piece of the fourth unit 3D shape data rotated by the predetermined angle α around each of the plurality of axes, from the plurality of second images.

Then, the specifying unit 605 aligns the directions of the third unit 3D shape data and the fourth unit 3D shape data, based on the comparison result between the images of the specified third combination and the images of the specified fourth combination. For example, the specifying unit 605 compares the six surfaces at the same time between the third unit 3D shape data and the fourth unit 3D shape data, and specifies a pattern with the highest overall evaluation.

As a result, the specifying unit 605 can align the directions of the first 3D shape data and the second 3D shape data and specify the second portion of the second 3D shape data corresponding to the first portion of the first 3D shape data.

However, when specifying the correspondence relationship of the portions between the pieces of 3D shape data classified into the same group, the specifying unit 605 may align the directions of the respective pieces of 3D shape data in the group, for example, by an operation input of the user using the client device 202. Furthermore, the specifying unit

605 may specify the corresponding portion between the pieces of 3D shape data in the group, by the operation input of the user.

Here, it is assumed that each portion (second portion) in the another 3D shape data (second 3D shape data) corresponding to the portion (first portion) in the 3D shape data (first 3D shape data) in the group be specified. In this case, the specifying unit 605 specifies the dimensional relationship between the different portions of the 3D shape data in the group, based on the correspondence relationship between the specified portions and the dimensional information for each portion of each 3D shape data in the group.

For example, the specifying unit 605 extracts a dimension of the first portion from the first 3D shape data. Furthermore, the specifying unit 605 extracts a dimension of the second portion corresponding to the first portion, from the second 3D shape data.

For example, the specifying unit 605 can create a dimension table 1700 as illustrated in FIG. 17 to be described later, by associating the extracted dimension of the first portion and the extracted dimension of the second portion. The specifying unit 605 specifies the dimensional relationship between the different portions of the 3D shape data in the group, based on the extracted dimension of the first portion with the extracted dimension of the second portion.

For example, the specifying unit 605 refers to the dimension table 1700 illustrated in FIG. 17 to be described later and creates a vector having a dimension of the portion in each 3D shape data as an element, for each portion in each 3D shape data in each group. Then, the specifying unit 605 creates a relational expression indicating a dimensional relationship between different portions based on the created vector for each portion, using one of the plurality of portions in each 3D shape data as an objective variable and another portion as an explanatory variable.

Furthermore, the specifying unit 605 may specify a relationship between positions of different hole portions on the same plane in the 3D shape data, for the 3D shape data in the group. For example, the specifying unit 605 determines whether or not the center point of each of the plurality of hole portions on the same straight line exists on the plane in each 3D shape data, for each 3D shape data in the group.

Here, in a case where the center point of each of the plurality of hole portions on the same straight line exists, the specifying unit 605 determines whether or not the center point of each of the plurality of hole portions is arranged at an equal interval on the straight line. Then, in a case where the center point of each of the plurality of hole portions is arranged at the equal interval on the straight line, the specifying unit 605 specifies the relationship between the positions of the different hole portions on the plane.

For example, the specifying unit 605 creates the hole position model for specifying the relationship between the positions of the different hole portions on the plane, from the interval between the center points of the hole portions at both ends of the plurality of hole portions and the interval between the center points of the adjacent hole portions of the plurality of hole portions, based on the number of hole portions included in the plurality of hole portions.

As a result, the specifying unit 605 can derive the relationship (hole position model) between the positions of the different hole portions on the plane. The hole position model represents a positional relationship between the plurality of hole portions, using the number of hole portions as a parameter and is included in the parametric model. The hole position model is derived for the surface (plane) in the 3D shape data in the group. A specific example of the hole position model will be described later with reference to FIG. 18.

The output unit 608 outputs information indicating the dimensional relationship between the specified portions, in association with the unit 3D shape data corresponding to the 3D shape data in the classified group. Here, the unit 3D shape data corresponding to the 3D shape data is, for example, unit 3D shape data created from the 3D shape data (after deletion). In this case, the unit 3D shape data does not include the dimensional information of the hole portion.

Therefore, the output unit 608 may further output the dimensional information of the hole portion in the 3D shape data in association. As a result, for example, when outputting the information indicating the dimensional relationship between the specified portions, in association with the unit 3D shape data, the output unit 608 can display a symbol representing the hole portion or the like, at a position corresponding to the center point of the hole portion in the unit 3D shape data.

The position corresponding to the center point of the hole portion in the unit 3D shape data can be arbitrarily set. For example, the position may be a predetermined position on a plane in the unit 3D shape data, corresponding to the plane where the center point of the hole portion exists in the original 3D shape data. The predetermined position is, for example, a position near the center, near the upper left, near the upper right, or the like of the plane.

Furthermore, the output unit 608 may further output information indicating a relationship between the positions of the specified hole portions, in association with the plane in the 3D shape data. For example, it is assumed that a hole position model corresponding to a first plane in the 3D shape data in the classified group be created. Furthermore, a plane corresponding to the first plane in the unit 3D shape data of the 3D shape data is set as a second plane.

In this case, for example, the output unit 608 may output the hole position model corresponding to the first plane, in association with the second plane in the unit 3D shape data. It can be said that the hole position model corresponding to the first plane represents a relationship between positions of hole portions on a plane in the another 3D shape data in the group, for example, corresponding to the first plane.

Examples of an output format by the output unit 608 include storage in the storage device such as the memory 302 or the disk 304, transmission to another computer (for example, to client device 202 illustrated in FIG. 2) by the communication I/F 305, display on a display (not illustrated), or the like. For example, the output unit 608 may store the information indicating the dimensional relationship between the specified portions in the storage unit 610, in association with the unit 3D shape data of the 3D shape data in the group.

For example, the output unit 608 may store the unit 3D shape data of the 3D shape data in the group as the standard shape data in the standard shape DB 230 illustrated in FIG. 5, in association with the relational expression indicating the dimensional relationship between the specified portions of the 3D shape data in the group. The relational expression may include the hole position model.

At this time, the output unit 608 may store information for specifying the 3D shape data classified into the same group based on the standard shape data (unit 3D shape data), for example, a similar shape list together in the standard shape DB 230. Furthermore, the output unit 608 may store dimensional information of a hole portion in any piece of 3D shape data classified into the same group together with the standard shape DB 230.

As a result, the parametric model (relational expression) of the 3D shape classified by the unit 3D shape data can be accumulated as knowledge along with the unit 3D shape data.

Furthermore, the creation unit 602 normalizes the designated target 3D shape data for each component in each coordinate axis direction to create the target unit 3D shape data. For example, the creation unit 602 deletes the dimensional information of the hole portion from the designated target 3D shape data. Then, the creation unit 602 normalizes the target 3D shape data (after deletion) for each component in each coordinate axis direction to create the unit 3D shape data.

The search unit 606 searches for first unit 3D shape data similar to the created target unit 3D shape data by reference to the storage unit 610. For example, the search unit 606 calculates the similarity between the target unit 3D shape data and the standard shape data by reference to the standard shape DB 230. Then, the search unit 606 searches for standard shape data of which the calculated similarity is equal to or more than the threshold.

The output unit 608 outputs the searched first unit 3D shape data and the information indicating the dimensional relationship between the different portions stored in the storage unit 610 in association with the first unit 3D shape data. For example, the output unit 608 outputs the searched standard shape data and the relational expression stored in the standard shape DB 230 in association with the standard shape data. At this time, the output unit 608 may display the symbol representing the hole portion, at a position corresponding to the center point of the hole portion in the standard shape data. Furthermore, the output unit 608 may output the hole position model created for the surface (first plane) in the 3D shape data corresponding to the surface, in association with the surface (second plane) in the standard shape data.

An output destination of the standard shape data and the relational expression is, for example, the client device 202. As a result, the designer can design the object according to the relational expression (parametric relationship) based on the standard shape data when newly designing the object.

Furthermore, the reception unit 601 may receive designation of design requirements for the object. Here, the design requirements for the object indicate conditions to be satisfied when designing the object, and indicate, for example, a dimension of a specific portion.

The generation unit 607 generates design data for the object according to the information indicating the dimensional relationship between the different portions stored in the storage unit 610 in association with the first unit 3D shape data based on the searched first unit 3D shape data and the designated design requirements. In this case, the output unit 608 outputs the generated design data for the object.

For example, the generation unit 607 generates the design data for the object according to the relational expression stored in the standard shape DB 230 in association with the standard shape data based on the searched standard shape data and the designated design requirements.

As a result, for example, when the designer designates a dimension of a specific side of the standard shape data, dimensions of other sides having the dimensional relationship with the specific side are automatically changed according to the relational expression, and the design data for the object can be automatically generated. Note that, in the case where design requirements contrary to the relational expression are designated, an error occurs as a requirement violation, for example.

Furthermore, the storage unit 610 may store the 3D shape data in the group in association with the unit 3D shape data of the 3D shape data in the group. In this case, the output unit 608 may output the 3D shape data in the group stored in the storage unit 610 in association with the searched first unit shape data.

For example, first, the output unit 608 specifies the similar shape list stored in the standard shape DB 230 in association with the searched standard shape data. Next, the output unit 608 extracts the 3D shape data of the id included in the specified similar shape list from the 3D shape DB 220. Then, the output unit 608 outputs the extracted 3D shape data.

As a result, when newly designing the object, the designer can design the object by diverting the 3D shape data designed in the past, which is classified into the same group as the target based on the unit 3D shape data, for example.

Furthermore, the output unit 608 may output the 3D shape data in the group stored in the storage unit 610 in association with the searched first unit shape data and the information indicating the dimensional relationship between the different portions. For example, first, the output unit 608 specifies the similar shape list stored in the standard shape DB 230 in association with the searched standard shape data.

Next, the output unit 608 extracts the 3D shape data of the id included in the specified similar shape list from the 3D shape DB 220. Then, the output unit 608 outputs the extracted 3D shape data and the relational expression (for example, including hole position model) stored in the standard shape DB 230 in association with the searched standard shape data.

As a result, the designer can design the object according to the relational expression (parametric relationship) based on the 3D shape data designed in the past when newly designing the object. Furthermore, for example, when the designer designates a dimension of a certain side of the 3D shape data designed in the past, dimensions of other sides having the dimensional relationship with the certain side are automatically changed according to the relational expression, and the design data for the object can be automatically generated. Furthermore, the designer can find a relationship that is periodically and discretely generated from the hole position model, regarding the plurality of hole portions on the same straight line.

Note that, in the above description, the standard shape DB 230 stores the unit 3D shape data for each 3D shape data classified into the same group. However, the present embodiment is not limited to this. For example, in the standard shape DB 230, only the unit 3D shape data of any one of the pieces of 3D shape data classified into the same group may be registered as the standard shape data.

(Operation Example of Model Generation Device 201)

Next, an operation example of the model generation device 201 will be described with reference to FIGS. 11A and 11B.

Figure 11A:
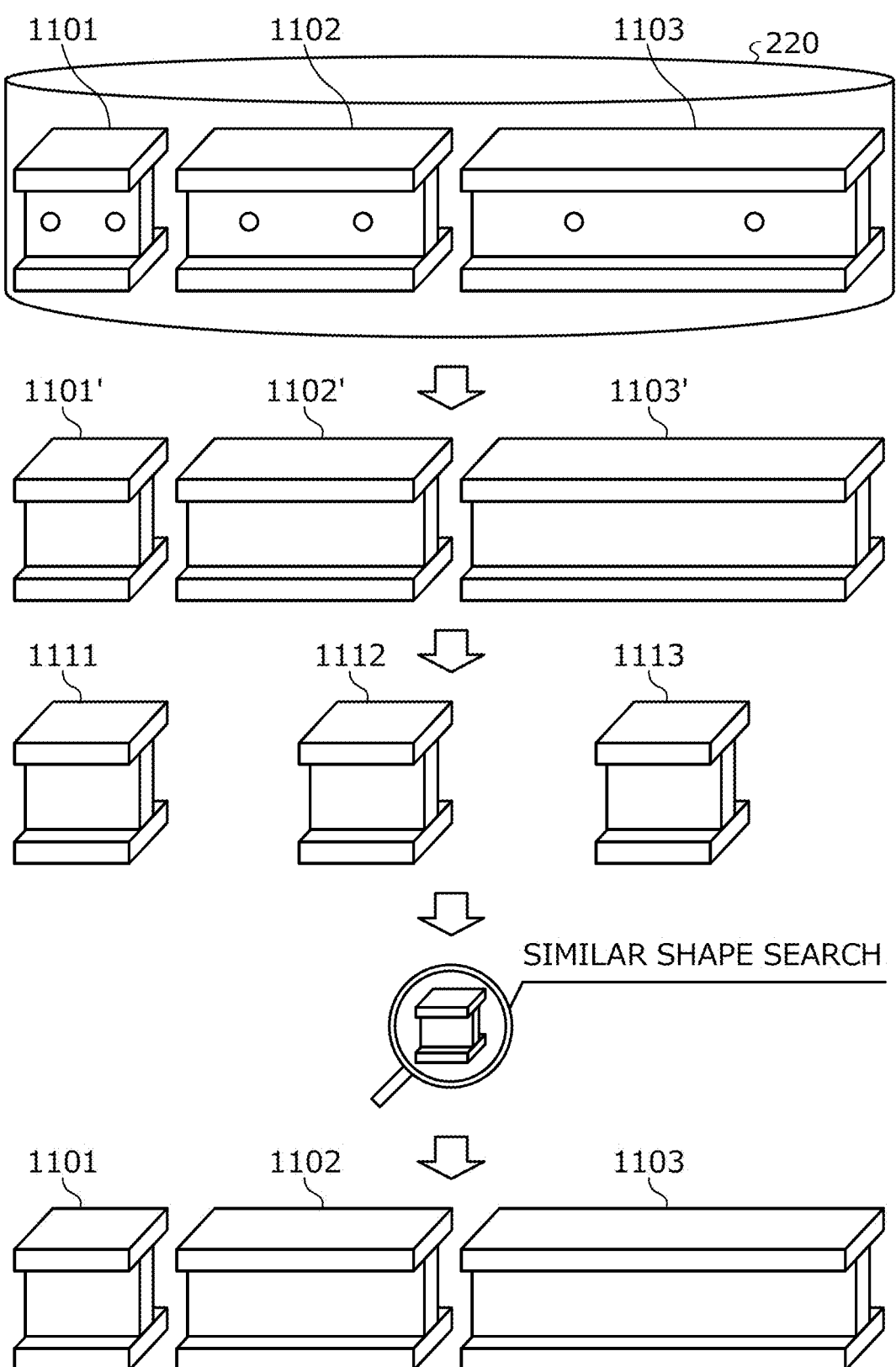
FIG. 11A is an explanatory diagram (part 1) illustrating an operation example of the model generation device 201.
Figure 11B:
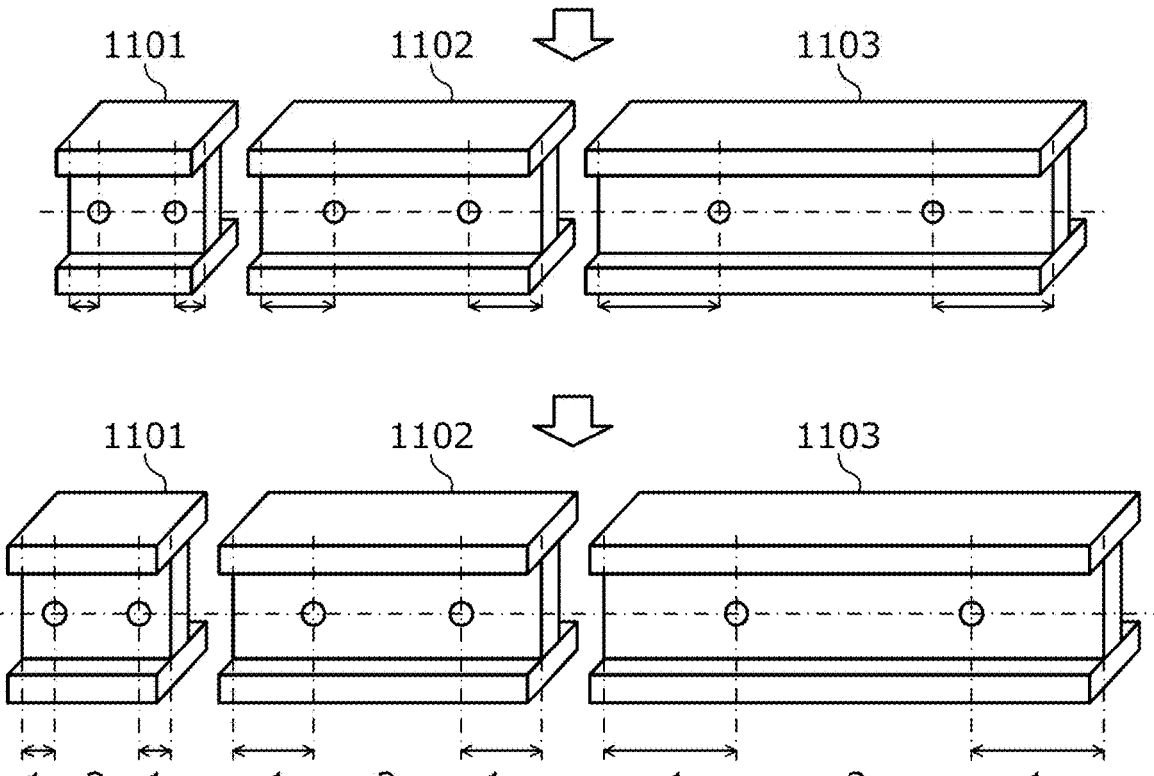
FIG. 11B is an explanatory diagram (part 2) illustrating the operation example of the model generation device 201.
Figure 11B:
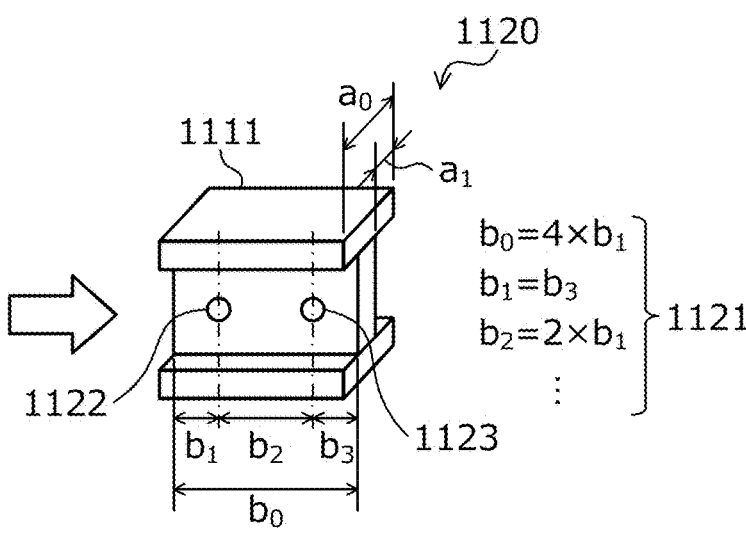

FIGS. 11A and 11B are explanatory diagrams illustrating the operation example of the model generation device 201. In FIG. 11A, 3D shape data 1101 to 1103 in the 3D shape DB 220 is illustrated. Each of the pieces of 3D shape data 1101 to 1103 is 3D shape data each including two hole portions, and the 3D shape data 1101 to 1103 is an example of a plurality of pieces of 3D shape data in the 3D shape DB 220.

The model generation device 201 deletes dimensional information of a hole portion from each of the pieces of 3D shape data 1101 to 1103. Here, pieces of 3D shape data 1101' to 1103' (after deletion) after the dimensional information of the hole portion has been deleted from the respective pieces of 3D shape data 1101 to 1103 are illustrated. At this time, the model generation device 201 may leave only a center point of the dimensional information of the hole portion, as the characteristic point, in each of the pieces of 3D shape data 1101' to 1103' (after deletion), for example.

Next, the model generation device 201 normalizes each of the pieces of 3D shape data 1101' to 1103' (after deletion) for each component in each coordinate axis direction to create unit 3D shape data. Here, each of pieces of unit 3D shape data 1111 to 1113 is created from each of the pieces of 3D shape data 1101' to 1103' (after deletion).

Then, the model generation device 201 classifies the 3D shape data 1101 to 1103 based on each of the pieces of created unit 3D shape data 1111 to 1113. Here, the 3D shape data 1101 is set as the target 3D shape data, and it is assumed that a similarity between the unit 3D shape data 1111 of the 3D shape data 1101 and the unit 3D shape data 1112 and 1113 be equal to or more than the threshold. In this case, the pieces of 3D shape data 1101 to 1103 are classified into the same group (similar shape search).

In FIG. 11B, the model generation device 201 calculates a first distance for each hole portion of each of the pieces of 3D shape data 1101 to 1103 in the classified group. The first distance is a distance between the center point of each hole portion and a straight line on the same plane in each of the pieces of 3D shape data 1101 to 1103. Then, the model generation device 201 adds the calculated first distance to the dimensional information of each hole portion of each of the pieces of 3D shape data 1101 to 1103.

Furthermore, the model generation device 201 calculates a second distance for each hole portion of each of the pieces of 3D shape data 1101 to 1103. The second distance is a distance between a center point of each hole portion and a center point of another hole portion on the same plane. Then, the model generation device 201 adds the calculated second distance to the dimensional information of each hole portion of each of the pieces of 3D shape data 1101 to 1103.

Here, a calculation example of a new dimension regarding the hole portion will be described with reference to FIG. 12.

Figure 12:
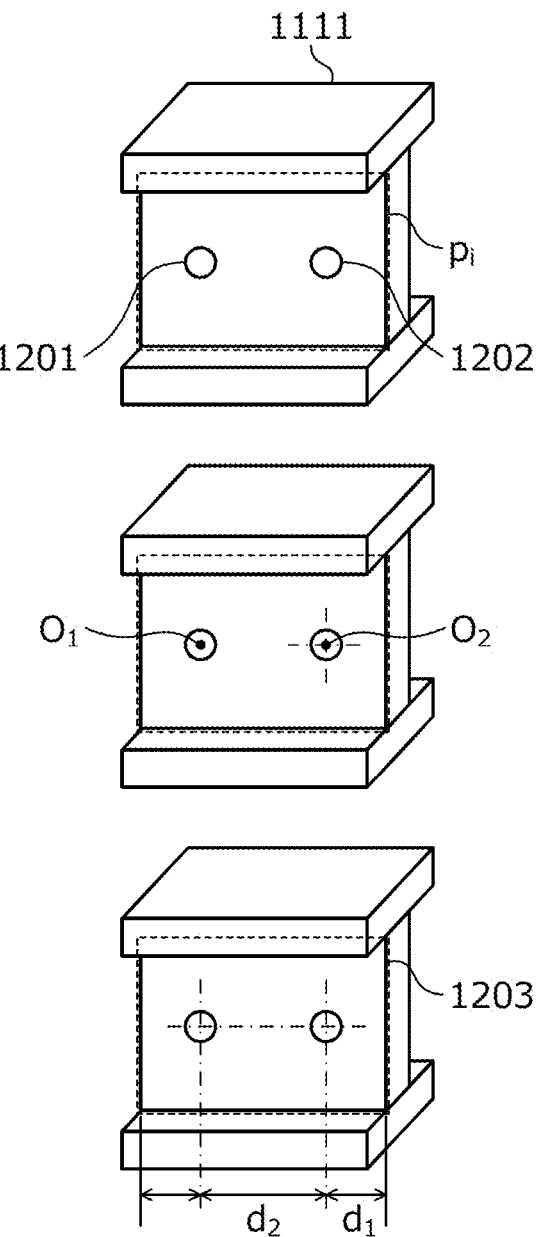
FIG. 12 is an explanatory diagram illustrating a calculation example of a new dimension regarding the hole portion.

FIG. 12 is an explanatory diagram illustrating the calculation example of the new dimension regarding the hole portion. In FIG. 12, the 3D shape data 1111 is illustrated. The 3D shape data 1111 includes hole portions 1201 and 1202. The model generation device 201 calculates an equation of a plane $p_i$ "$p_i$: $\alpha x+\beta y+\gamma z+\delta=0$" from coordinates of three end points of the plane $p_i$ (end point of edge portion) ($\alpha$, $\beta$, $\gamma$, and $\delta$ are constants).

Next, the model generation device 201 specifies a center point $O_i$ of a hole portion on the plane $p_i$ from the equation "$p_i$: $\alpha x+\beta y+\gamma z+\delta=0$" of the plane $p_i$. Here, the center points $O_1$ and $O_2$ of the two hole portions 1201 and 1202 are specified. The model generation device 201 calculates the first and second distances for each of the hole portions 1201 and 1202.

For example, regarding the hole portion 1202, a distance d1 between the center point $O_2$ and a straight line 1203 on the same plane $p_i$ is calculated as the first distance. Furthermore, regarding the hole portion 1202, a distance d2 between the center point $O_2$ and a center point O of the another hole portion 1201 on the same plane $p_i$ is calculated as the second distance.

Returning to the description of FIG. 11B, the model generation device 201 specifies a dimensional relationship between the different portions of the 3D shape data 1101 to 1103 in the group, based on the dimensional information for each portion of each of the pieces of 3D shape data 1101 to 1103 in the classified group. Here, a case is assumed where the dimensional relationship between the different portions of the 3D shape data 1101 to 1103 is specified and a parametric model 1120 is generated.

The parametric model 1120 includes the unit 3D shape data 1111 and a relational expression 1121. In the unit 3D shape data 1111, symbols 1122 and 1123 representing the hole portions are displayed at the positions where the center point (characteristic point) of the hole portion exists. The relational expression 1121 is a relational expression the dimensional relationship between the different portions of the 3D shape data 1101 to 1103.

(Construction Example of Parametric Model)

Next, a construction example of the parametric model will be described with reference to FIGS. 13 to 17.

Figure 13:
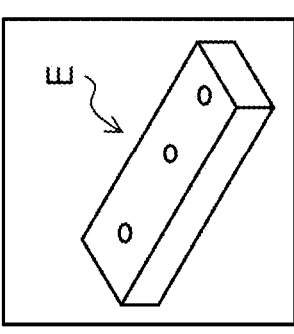
FIG. 13 is an explanatory diagram illustrating an example of the 3D shape data.
Figure 13:
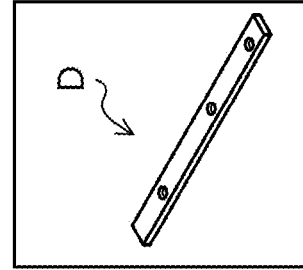
Figure 13:
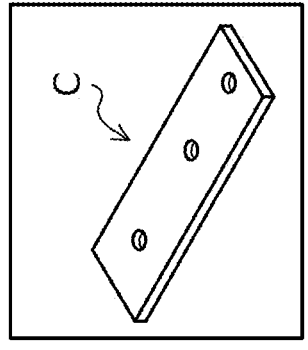
Figure 13:
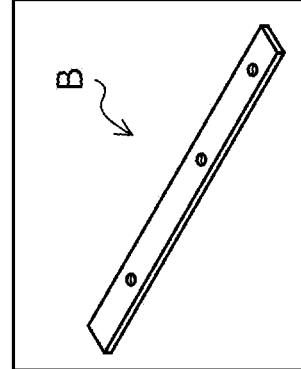
Figure 13:
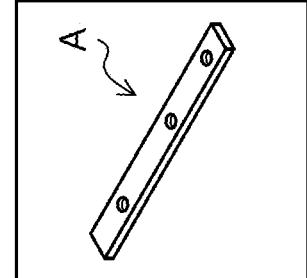

FIG. 13 is an explanatory diagram illustrating an example of the 3D shape data. In FIG. 13, pieces of 3D shape data A to E are 3D shape data classified into the same group based on the unit 3D shape data. Here, a calculation example of a new dimension (first distance and second distance) will be described using the 3D shape data C as an example.

Figure 14:
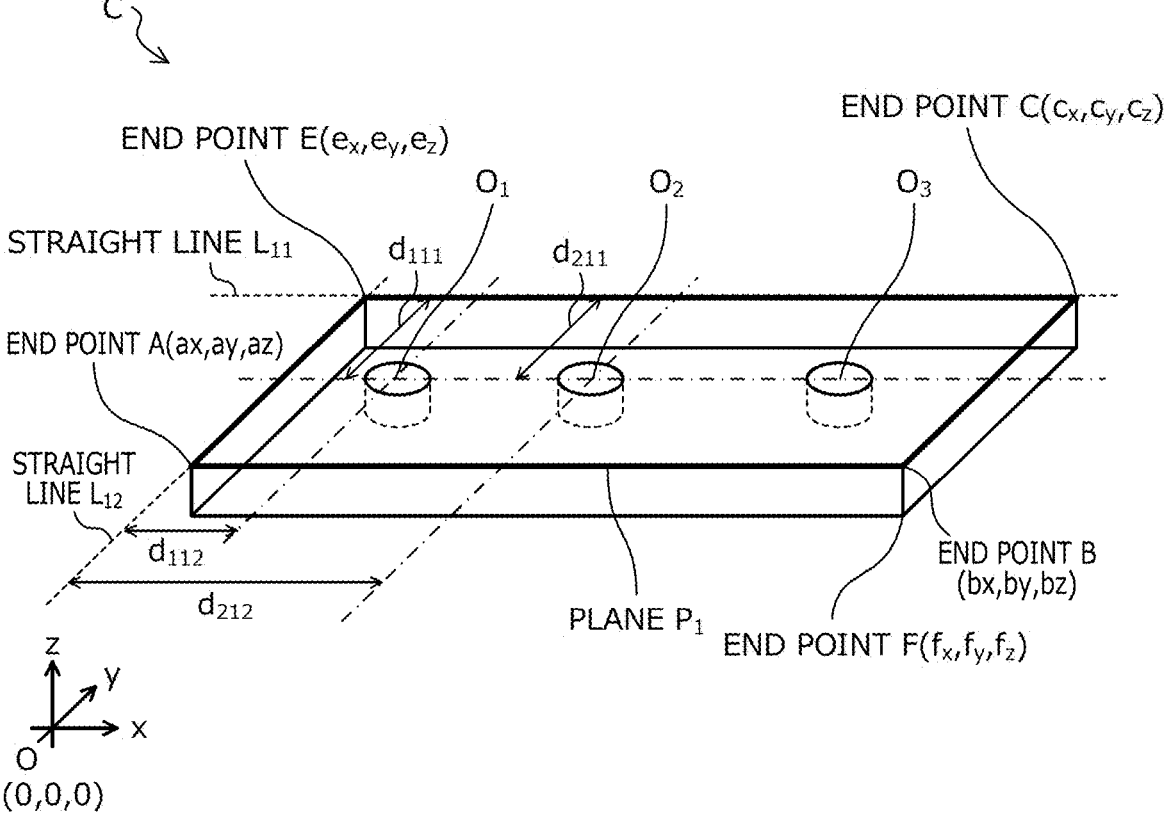
FIG. 14 is an explanatory diagram (part 1) illustrating a calculation example of a new dimension.
Figure 15:
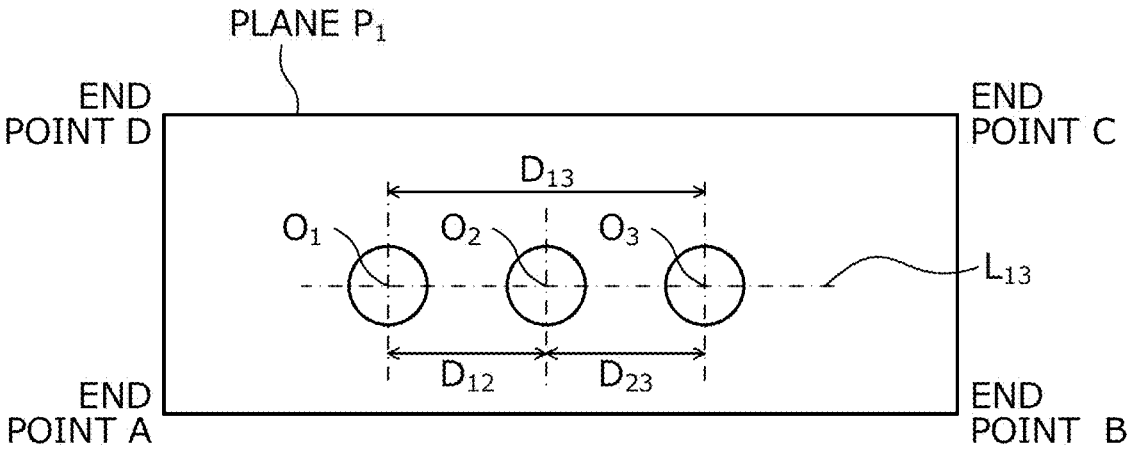
FIG. 15 is an explanatory diagram (part 2) illustrating a calculation example of the new dimension.

FIGS. 14 and 15 are explanatory diagrams illustrating the calculation example of the new dimension. In FIG. 14, a plane $P_1$ in the 3D shape data C is illustrated. Here, the calculation example of the new dimension will be described using the plane $P_1$ in the 3D shape data C as an example.

(i) The model generation device 201 calculates an equation "$p_i$: $\alpha_1 x+\beta_1 y+\gamma_1 z+\delta_1=0$" of the plane $P_1$, from coordinates $(a_x, a_y, a_z)$ of an end point A of the plane $P_1$, coordinates $(b_x, b_y, b_z)$ of an end point B, and coordinates $(c_x, c_y, c_z)$ of an end point C. Here, although the plane $P_1$ has been described as an example, the equation of the plane $P_i$ is calculated for each plane $P_i$ in the 3D shape data C (i=1, 2, . . . ).

(ii) The model generation device 201 specifies the center point on each plane $P_i$ from coordinates of a center point $O_j$ of each hole portion in the 3D shape data C and sets the center point as a group $G_{ik}$ (k=1, 2, . . . ). Here, a group $G_{11}$ including the center points $O_1$, $O_2$, $O_3$ on the plane $P_1$ is specified.

(iii) The model generation device 201 calculates a distance $d_{jim}$ between each center point $O_j$ in the group $G_{ik}$ and a straight line $L_{im}$ (m=1, 2, . . . ) on the plane $P_i$. Here, a distance $d_{111}$ between the center point $O_1$ on the plane $P_1$ and a straight line $L_{11}$ on the plane $P_1$ is calculated (first distance). Furthermore, a distance $d_{112}$ between the center point $O_1$ on the plane $P_1$ and a straight line $L_{12}$ on the plane $P_i$ is calculated (first distance).

Furthermore, a distance $d_{211}$ between the center point $O_2$ on the plane $P_1$ and the straight line $L_{11}$ on the plane $P_1$ is calculated (first distance). Furthermore, a distance $d_{212}$ between the center point $O_2$ on the plane $P_1$ and the straight line $L_{12}$ on the plane $P_1$ is calculated (first distance).

Although not illustrated, similarly, regarding the center point $O_3$ on the plane $P_1$, a distance $d_{311}$ between the center point $O_3$ on the plane $P_1$ and the straight line $L_{11}$ on the plane $P_1$ is calculated (first distance). Furthermore, a distance $d_{312}$ between the center point $O_3$ on the plane $P_1$ and the straight line $L_{12}$ on the plane $P_1$ is calculated (first distance).

In FIG. 15, the plane $P_1$ (end points A to D) in the 3D shape data C is illustrated. (iv) The model generation device 201 calculates a distance $D_{st}$ between different center points (between center point $O_s$ and center point $O_t$) with respect to a center point group in the group $G_{ik}$. (s,t: natural number) Here, a distance $D_{12}$ between the center points $O_1$ and $O_2$ in the group $G_{11}$, a distance $D_{13}$ between the center points $O_1$ and $O_3$ in the group $G_{11}$, and a distance $D_{23}$ between the center points $O_2$ and $O_3$ in the group $G_{11}$ are calculated.

(v) The model generation device 201 constructs the equation $L_{st}$ of the straight line connecting the different center points $O_s$ and $O_t$ with respect to the center point group in the group $G_{ik}$ and searches for points on the same straight line using $L_{st}$ in a round-robin manner. Then, the model generation device 201 creates a group of the center points on the same straight line and sets the number of center points to a new number N of parameters.

The equation $L_{st}$ is represented, for example, by the following formula (7). However, coordinates of the center point $O_s$ are set to $(x_s, y_s, z_s)$, and coordinates of the center point $O_t$ are set to $(x_t, y_t, z_t)$.

$$L_{st}: (x - x_s)/(x_s - x_t) = (y - y_s)/(y_s - y_t) = (z - z_s)/(z_s - z_t) \qquad (7)$$

For example, the model generation device 201 executes the processing in (i) to (v) described above on each surface (plane $P_i$) in each of the pieces of 3D shape data A to E illustrated in FIG. 13. The calculated result is added to the dimensional information of each hole portion in each of the pieces of 3D shape data A to E. Then, the model generation device 201 extracts a dimension of each portion from each of the pieces of 3D shape data A to E and creates the dimension table 1700 illustrated in FIG. 17.

Figure 16:
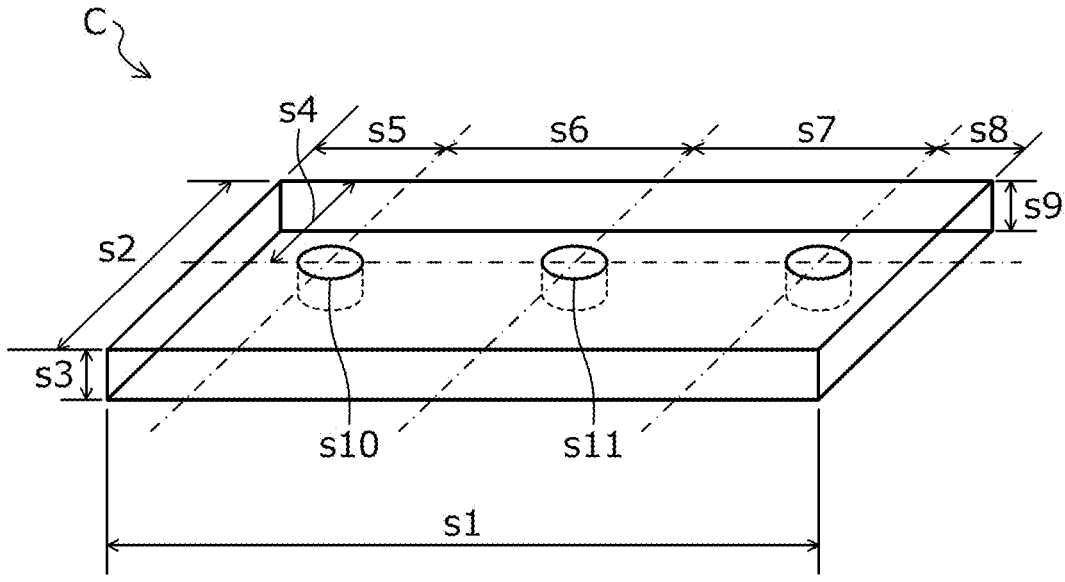
FIG. 16 is an explanatory diagram illustrating an example of dimensions of portions in the 3D shape data.

FIG. 16 is an explanatory diagram illustrating an example of the dimensions of the portion in the 3D shape data. FIG. 17 is an explanatory diagram illustrating a construction example of a relational expression indicating the dimensional relationship between the portions. In FIG. 16, the 3D shape data C of the pieces of 3D shape data A to E classified into the same group is illustrated.

References s1 to s11 in the 3D shape data C indicate dimensions regarding a portion in the 3D shape data C. However, in FIGS. 16 and 17, some of the dimensions regarding the portion in the 3D shape data C are extracted and displayed. For example, the dimensions s1 to s3 and s9 indicate lengths of the portion "side". The dimensions s10 and s11 indicate dimensions (for example, radius) of the hole portion. The dimensions s4 to s8 indicate dimensions (for example, first distance and second distance) newly calculated for the hole portion.

First, the model generation device 201 aligns the directions of the x axis, the y axis, and the z axis, of the unit 3D shape data of the pieces of 3D shape data A to E classified into the same group. Next, the model generation device 201 creates the dimension table 1700 of each portion illustrated in FIG. 17, by aligning the directions of the pieces of 3D shape data A to E based on the unit 3D shape data in which the directions are aligned and ensuring consistency of vertexes and dimensions to be the same portion.

In FIG. 17, the dimension table 1700 indicates the dimensions s1 to s11 regarding each portion in each of the pieces of 3D shape data A to E. Here, only the dimensions s1 to s11 of the dimensions s1 to sn (n: natural number) regarding each portion in each of the pieces of 3D shape data A to E are illustrated.

Next, the model generation device 201 refers to the created dimension table 1700 and derives a relational expression by the regression analysis or the like based on the dimensional relationship between the portions. For example, for each dimension, the model generation device 201 creates a column vector v (for example, $v_1, v_2, \ldots, v_n$) with a value of each dimension in each of the pieces of 3D shape data A to E as an element.

Then, the model generation device 201 obtains a relational expression indicating the dimensional relationship between the portions, using a variable v $[v_1, v_2, \ldots, v_n]$. For example, the model generation device 201 divides the variables v into an objective variable y and an explanatory variable x and constructs a regression model. For example, when constructing a regression model with $v_n$ as the objective variable y and the remaining variables as explanatory variables $x_k$, the regression model is expressed in the following formula (8), where $\beta_0$, $\beta_1$, $\beta_2$, . . . are regression parameters.

[Expression 1]

$$y = \beta_0 + \sum_{k=1}^{N-1} \beta_k x_k \qquad (8)$$

In a case of the 3D shape data C illustrated in FIG. 16, for example, relational expressions (regression models) of the following formulas (9) to (13) are obtained. However, the following formulas (9) to (13) are obtained by extracting some of the relational expressions indicating the dimensional relationship between the portions.

$$s5 = s6 \times 0.5 \qquad (9)$$

$$s5 = s1 \times 0.2 \qquad (10)$$

$$s4 = s2 \times 0.5 \qquad (11)$$

$$s9 = s3 \qquad (12)$$

$$s10 = s11 \qquad (13)$$

As a result, the model generation device 201 can construct parametric models (for example, above formulas (9) to (13)) of shapes (3D shape data A to E) classified based on the unit 3D shape data.

(Specific Example of Hole Position Model)

Next, a specific example of the hole position model will be described.

Figure 18:
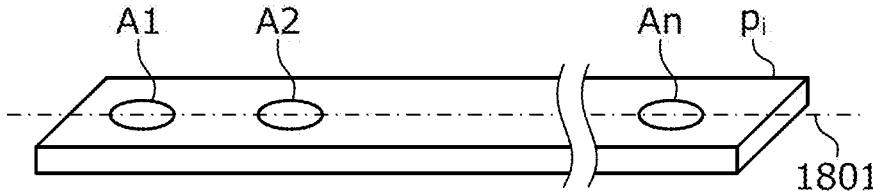
FIG. 18 is an explanatory diagram illustrating a specific example of a hole position model.
Figure 18:
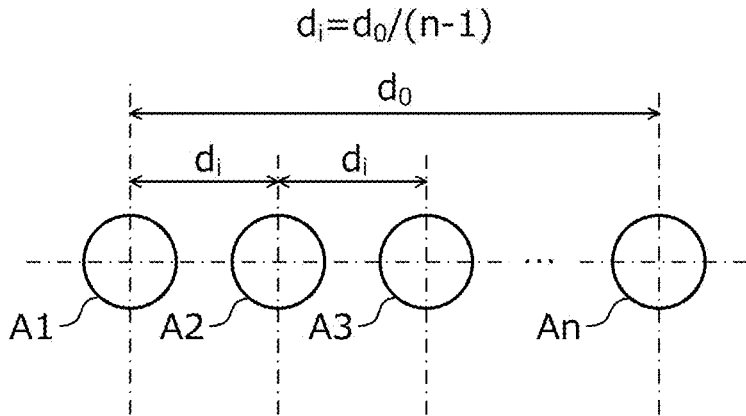

FIG. 18 is an explanatory diagram illustrating the specific example of the hole position model. In FIG. 18, hole portions A1, A2, . . . , and An indicate a plurality of hole portions of which respective center points of the hole portions A1, A2, . . . , and An are arranged at equal intervals on a same straight line 1801, on a same plane $p_i$ in the 3D shape data.

In such a case, a positional relationship between the hole portions A1, A2, . . . , and An on the plane $p_i$ is represented by the hole position model as in the following formula (14), for example. However, n indicates the number of hole portions. The reference do indicates an interval between the center points of the hole portions at both ends of the hole portions A1 to An. The reference $d_1$ indicates an interval between the center points of the adjacent hole portions of the hole portions A1 to An.

$$d_i = d_0/(n - 1) \qquad (14)$$

Figure 19A:
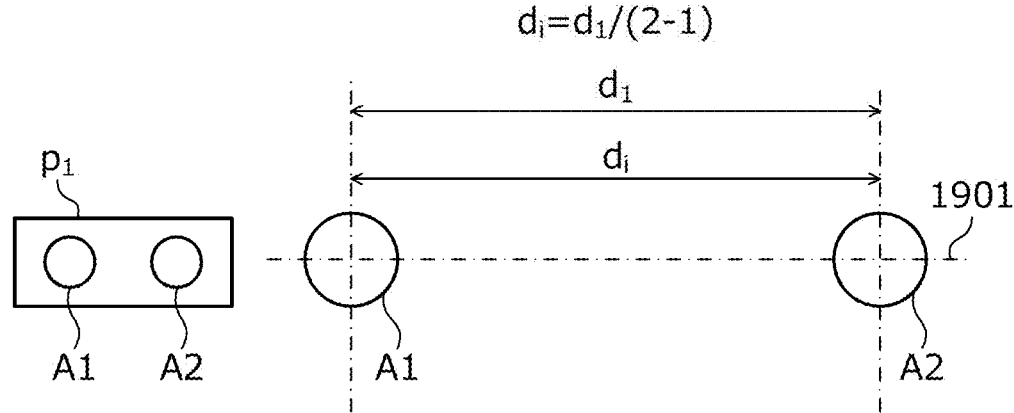
FIG. 19A is an explanatory diagram (part 1) illustrating an arrangement example of the hole portions.
Figure 19B:
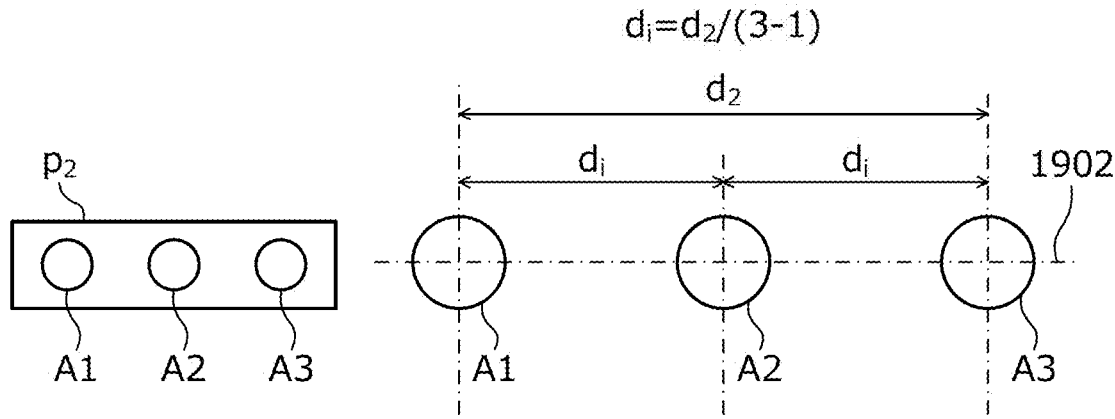
FIG. 19B is an explanatory diagram (part 2) illustrating an arrangement example of the hole portions.
Figure 19C:
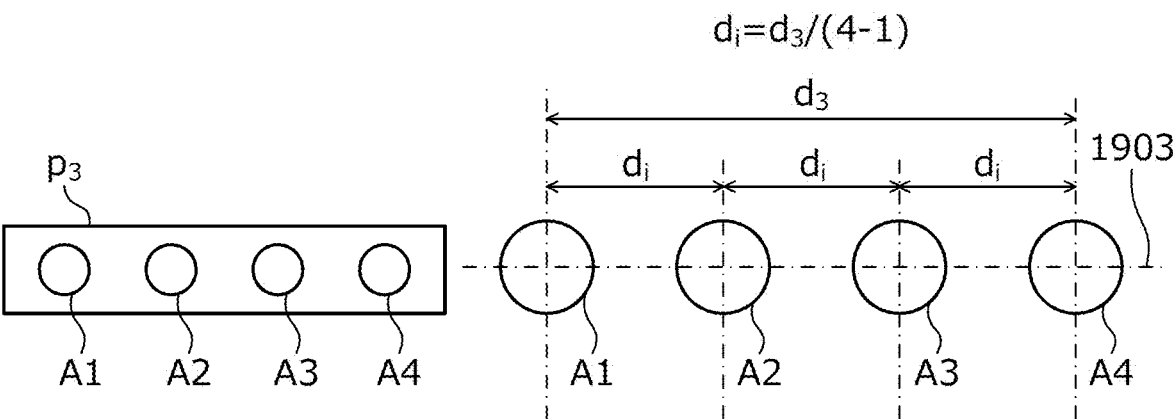
FIG. 19C is an explanatory diagram (part 3) illustrating an arrangement example of the hole portions.

FIGS. 19A to 19C are explanatory diagrams illustrating an arrangement example of the hole portions. In FIG. 19A, the two hole portions A1 and A2 arranged at equal intervals on a same straight line 1901, on the same plane p1 in the 3D shape data are illustrated. In this case, a hole position model "$d_i=d_1/(2-1)$" representing a positional relationship between the hole portions A1 to A2 is created by substituting the number of hole portions "n=2" into the above formula (14).

In FIG. 19B, the three hole portions A1 to A3 arranged at equal intervals on a same straight line 1902, on a same plane p2 in the 3D shape data are illustrated. In this case, a hole position model "$d_1=d_2/(3-1)$" representing a positional relationship between the hole portions A1 to A3 is created by substituting the number of hole portions "n=3" into the above formula (14).

In FIG. 19C, the four hole portions A1 to A4 arranged at equal intervals on a same straight line 1903 on a same plane p3 in the 3D shape data are illustrated. In this case, a hole position model "$d_1=d_3/(4-1)$" representing a positional relationship between the hole portions A1 to A4 is created by substituting the number of hole portions "n=4" into the above formula (14).

In this way, according to the hole position model, for example, on the plane $p_i$ in the 3D shape data, it is possible to find the relationship between the plurality of hole portions that periodically appears on the same straight line.

(Various Processing Procedure of Model Generation Device 201)

Next, various processing procedures of the model generation device 201 will be described with reference to FIGS. 20 to 31. First, a preliminary preparation processing procedure of the model generation device 201 will be described with reference to FIG. 20.

Figure 20:
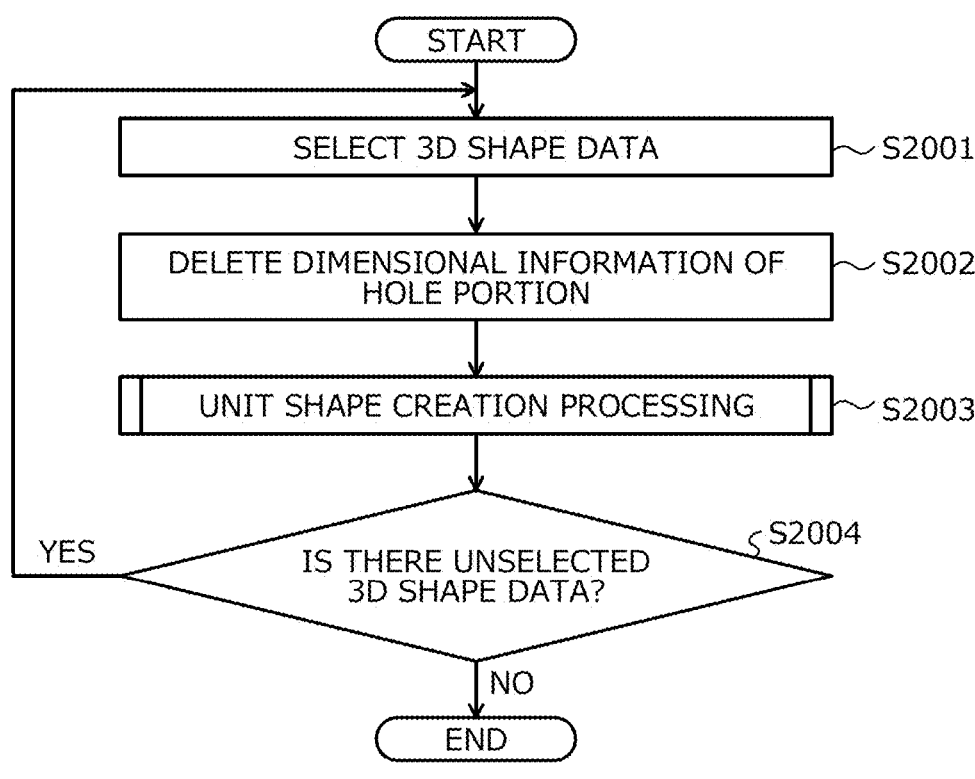
FIG. 20 is a flowchart illustrating an example of a preliminary preparation processing procedure of the model generation device 201.

FIG. 20 is a flowchart illustrating an example of the preliminary preparation processing procedure of the model generation device 201. In the flowchart in FIG. 20, first, the model generation device 201 refers to the 3D shape DB 220 and selects unselected 3D shape data that is not selected (step S2001). The 3D shape data to be selected is, for example, 3D shape data including the specific portion (curve portion or hole portion).

Next, the model generation device 201 creates 3D shape data (after deletion) from which dimensional information of the hole portion has been deleted, for the selected 3D shape data (step S2002). Then, the model generation device 201 executes unit shape creation processing on the 3D shape data (after deletion) (step S2003). A specific processing procedure of the unit shape creation processing will be described later with reference to FIG. 21.

Then, the model generation device 201 refers to the 3D shape DB 220 and determines whether or not there is unselected 3D shape data that is not selected (step S2004). Here, in a case where there is the unselected 3D shape data (step S2004: Yes), the model generation device 201 returns to step S2001. On the other hand, in a case where there is no unselected 3D shape data (step S2004: No), the model generation device 201 ends the series of processing according to the present flowchart.

As a result, as preliminary preparation, the model generation device 201 can create the unit 3D shape data of each 3D shape data registered in the 3D shape DB 220. At this time, in a case where the hole portion is included in the 3D shape data, the model generation device 201 can create unit 3D shape data of the 3D shape data (after deletion), from which the dimensional information of the hole portion has been deleted, from the 3D shape data. Note that the created unit 3D shape data may be held in the 3D shape DB 220 in association with the creation-source 3D shape data, for example.

Next, a specific processing procedure of the unit shape creation processing in step S2003 illustrated in FIG. 20 will be described with reference to FIG. 21.

Figure 21:
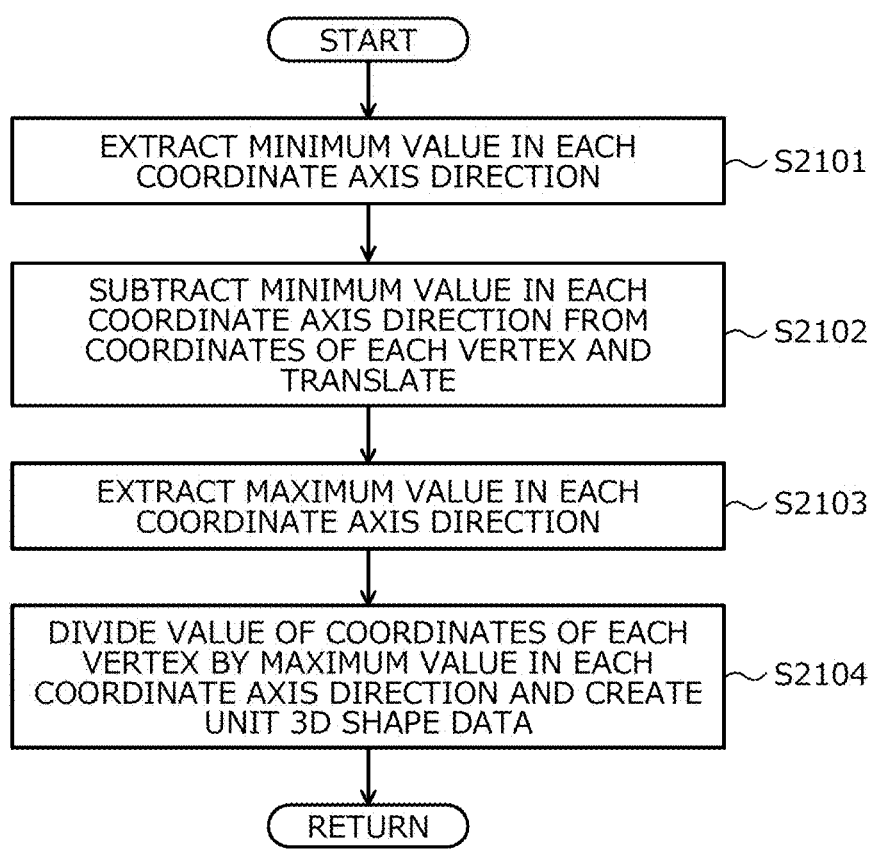
FIG. 21 is a flowchart illustrating an example of a specific processing procedure of unit shape creation processing.

FIG. 21 is a flowchart illustrating an example of the specific processing procedure of the unit shape creation processing. In the flowchart in FIG. 21, first, the model generation device 201 extracts a minimum value in each coordinate axis direction from coordinates of each vertex of the 3D shape data (after deletion) (step S2101). Then, the model generation device 201 subtracts the extracted minimum value in each coordinate axis direction from each value of the coordinates of each vertex, and translates the 3D shape data (after deletion) (step S2102).

Next, the model generation device 201 extracts a maximum value in each coordinate axis direction from coordinates of each vertex of the 3D shape data (after deletion) after translation (step S2103). Then, the model generation device 201 creates the unit 3D shape data by dividing each value of the coordinates of each vertex of the 3D shape data (after deletion) after translation by the extracted maximum value in each coordinate axis direction (step S2104) and returns to the step in which the unit shape creation processing is called.

As a result, the model generation device 201 can normalize the 3D shape data (after deletion) while maintaining the dimensional relationship between the portions in each coordinate axis direction.

Next, a standard shape registration processing procedure of the model generation device 201 will be described with reference to FIG. 22. The standard shape registration processing is processing for preliminary registering the standard shape data in the standard shape DB 230, before designing the object.

Figure 22:
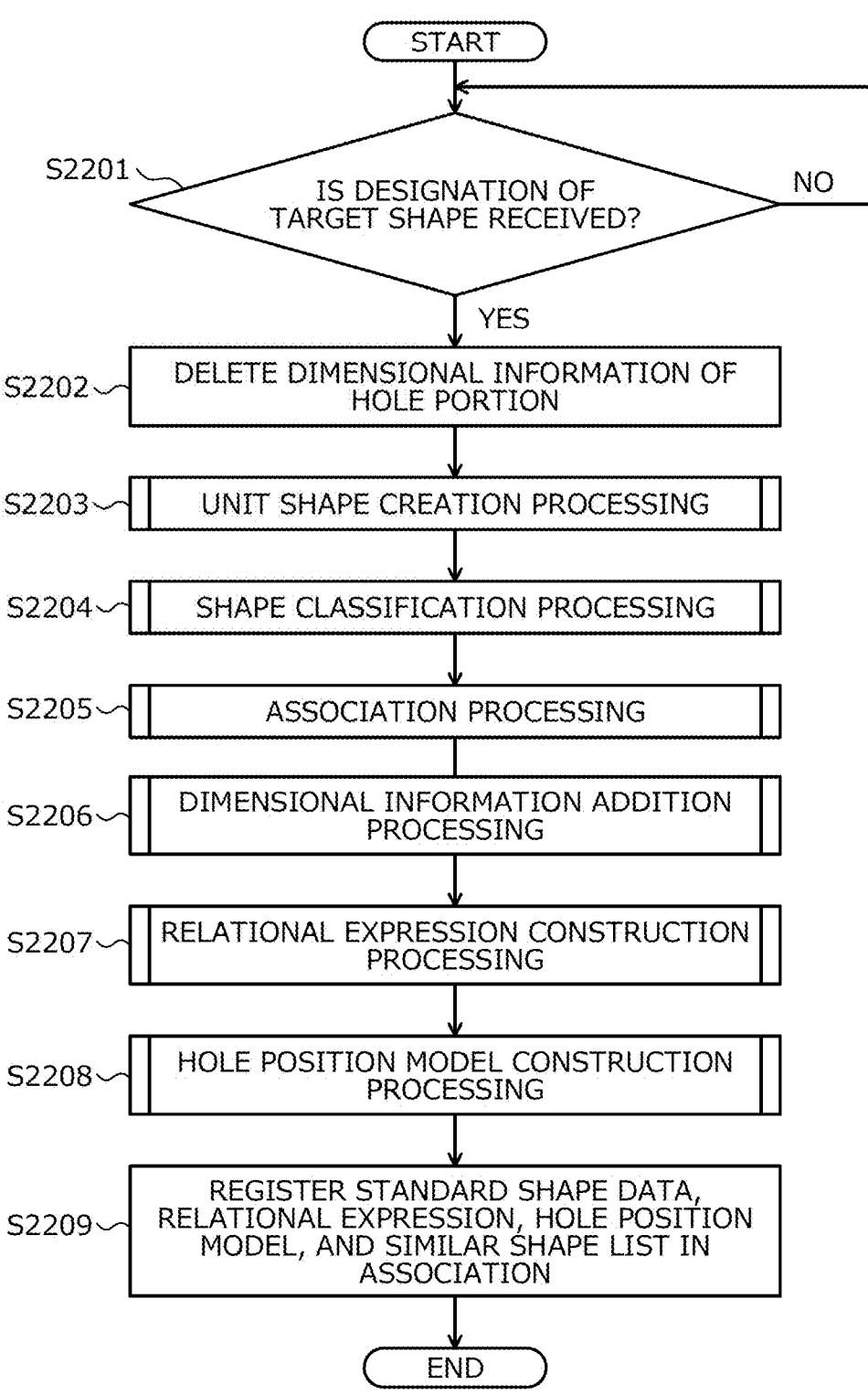
FIG. 22 is a flowchart illustrating an example of a standard shape registration processing procedure of the model generation device 201.

FIG. 22 is a flowchart illustrating an example of the standard shape registration processing procedure of the model generation device 201. In the flowchart in FIG. 22, first, the model generation device 201 determines whether or not designation of a target shape is received (step S2201). The target shape designated here is 3D shape data designated for classifying the 3D shape data registered in the 3D shape DB 220, and is designated from, for example, the 3D shape DB 220.

Here, the model generation device 201 waits for the reception of the designation of the target shape (step S2201: No). Then, in a case where the designation of the target shape is received (step S2201: Yes), the model generation device 201 creates the target shape (after deletion) from which the dimensional information of the hole portion has been deleted, for the designated target shape (step S2202), and executes the unit shape creation processing for the target shape (after deletion) (step S2203).

Note that, since a specific processing procedure of the unit shape creation processing for the target shape is similar to the processing procedure illustrated in FIG. 21, illustration and description are omitted. In a case where the unit 3D shape data of the target shape has been already created, the model generation device 201 may skip step S2203.

Next, the model generation device 201 executes shape classification processing for classifying the plurality of pieces of 3D shape data based on the created unit 3D shape data (step S2204). A specific processing procedure of the shape classification processing will be described later with reference to FIG. 23.

Then, the model generation device 201 executes association processing for specifying a correspondence relationship between the portions between the pieces of 3D shape data in the classified group (step S2205). A specific processing procedure of the association processing will be described later with reference to FIG. 24.

Next, the model generation device 201 executes dimensional information addition processing for adding a new dimension to each piece of the 3D shape data in the classified group (step S2206). A specific processing procedure of the dimensional information addition processing will be described later with reference to FIGS. 26 and 27.

Then, the model generation device 201 executes relational expression construction processing for constructing a dimensional relational expression between different portions of the 3D shape data in the classified group (step S2207). A specific processing procedure of the relational expression construction processing will be described later with reference to FIG. 28.

Next, the model generation device 201 executes hole position model construction processing for constructing the hole position model for each surface, for each piece of the 3D shape data in the classified group (step S2208). A specific processing procedure of the hole position model construction processing will be described later with reference to FIG. 29.

Then, the model generation device 201 uses the unit 3D shape data of each 3D shape data in the group respectively as the standard shape data and registers the standard shape data, the constructed relational expression and hole position model, and the similar shape list into the standard shape DB 230 in association (step S2209) and ends the series of processing according to the present flowchart.

As a result, the model generation device 201 can make the parametric model (relational expression and hole position model) of the 3D shape classified by the standard shape data into a DB, together with the standard shape data (unit 3D shape data).

Next, the specific processing procedure of the shape classification processing in step S2204 illustrated in FIG. 22 will be described with reference to FIG. 23. Here, the unit 3D shape data of the target shape (after deletion) created in step S2203 illustrated in FIG. 22 is referred to as a "unit target shape".

Figure 23:
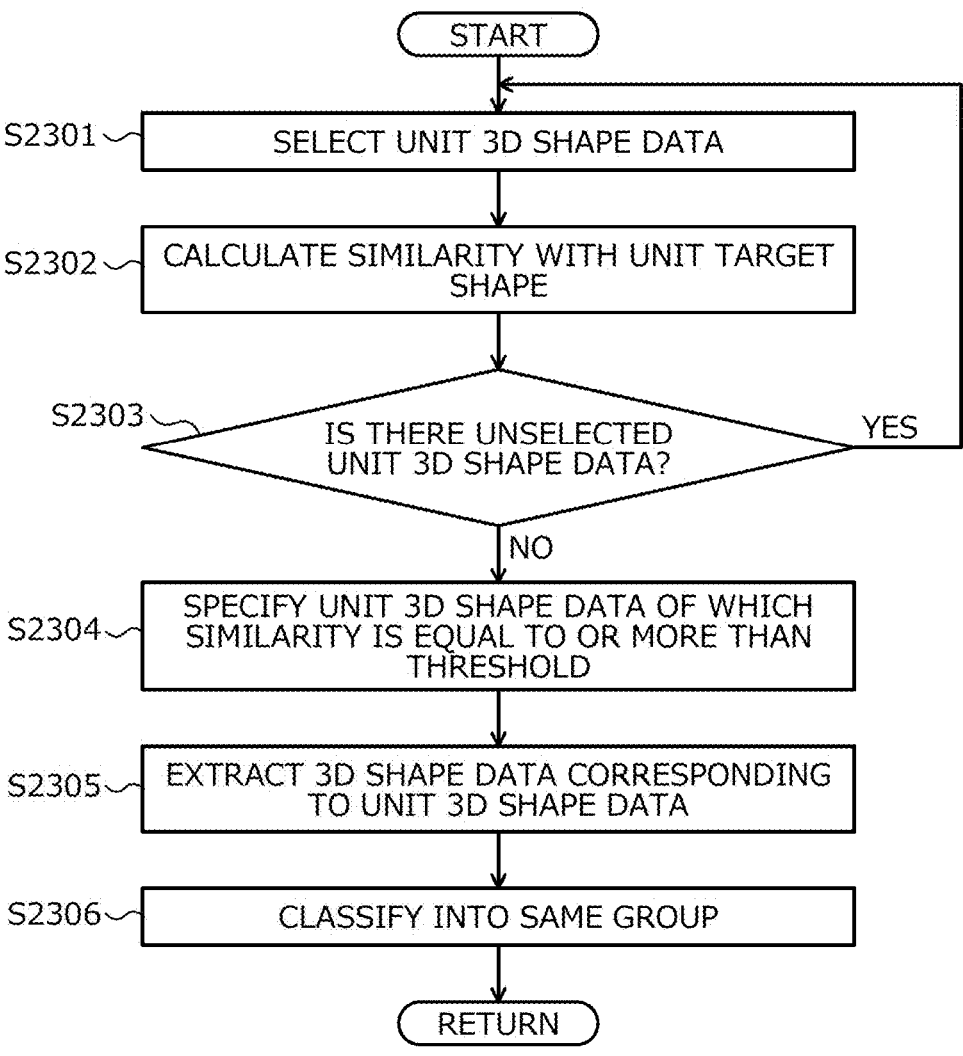
FIG. 23 is a flowchart illustrating an example of a specific processing procedure of shape classification processing.

FIG. 23 is a flowchart illustrating an example of the specific processing procedure of the shape classification processing. In the flowchart in FIG. 23, first, the model generation device 201 selects unselected unit 3D shape data that is not selected, of the unit 3D shape data for each 3D shape data in the 3D shape DB 220 (step S2301).

Then, the model generation device 201 calculates a similarity between the selected unit 3D shape data and the created unit target shape (step S2302). Next, the model generation device 201 determines whether or not there is unselected unit 3D shape data that is not selected of the unit 3D shape data of each 3D shape data in the 3D shape DB 220 (step S2303).

Here, in a case where there is the unselected unit 3D shape data (step S2303: Yes), the model generation device 201 returns to step S2301. On the other hand, in a case where there is no unselected unit 3D shape data (step S2303: No), unit 3D shape data of which the calculated similarity is equal to or more than a threshold is specified (step S2304).

Next, the model generation device 201 extracts 3D shape data corresponding to the specified unit 3D shape data from the 3D shape DB 220 (step S2305). Then, the model generation device 201 classifies the extracted 3D shape data into the same group (step S2306) and returns to the step in which the shape classification processing is called.

As a result, the model generation device 201 can classify the 3D shape data having similar unit 3D shape data to the target 3D shape data into the same group. For example, not only the same shapes or similar shapes but also the shapes having partially different dimensions can be classified into the same group, and versatility at the time of newly designing the object can be improved by performing grouping close to human sensibility.

Furthermore, the unit 3D shape data is created based on the 3D shape data (after deletion) from which the dimensional information of the hole portion has been deleted. Therefore, the model generation device 201 can accurately search for the similar shape even in the 3D shape data including the hole portion. For example, when converting the unit 3D shape data, the model generation device 201 can prevent a circular shape of the hole portion from becoming an elliptical shape and the accuracy of the similar shape search from being lowered.

Next, the specific processing procedure of the association processing in step S2205 illustrated in FIG. 22 will be described with reference to FIG. 24.

Figure 24:
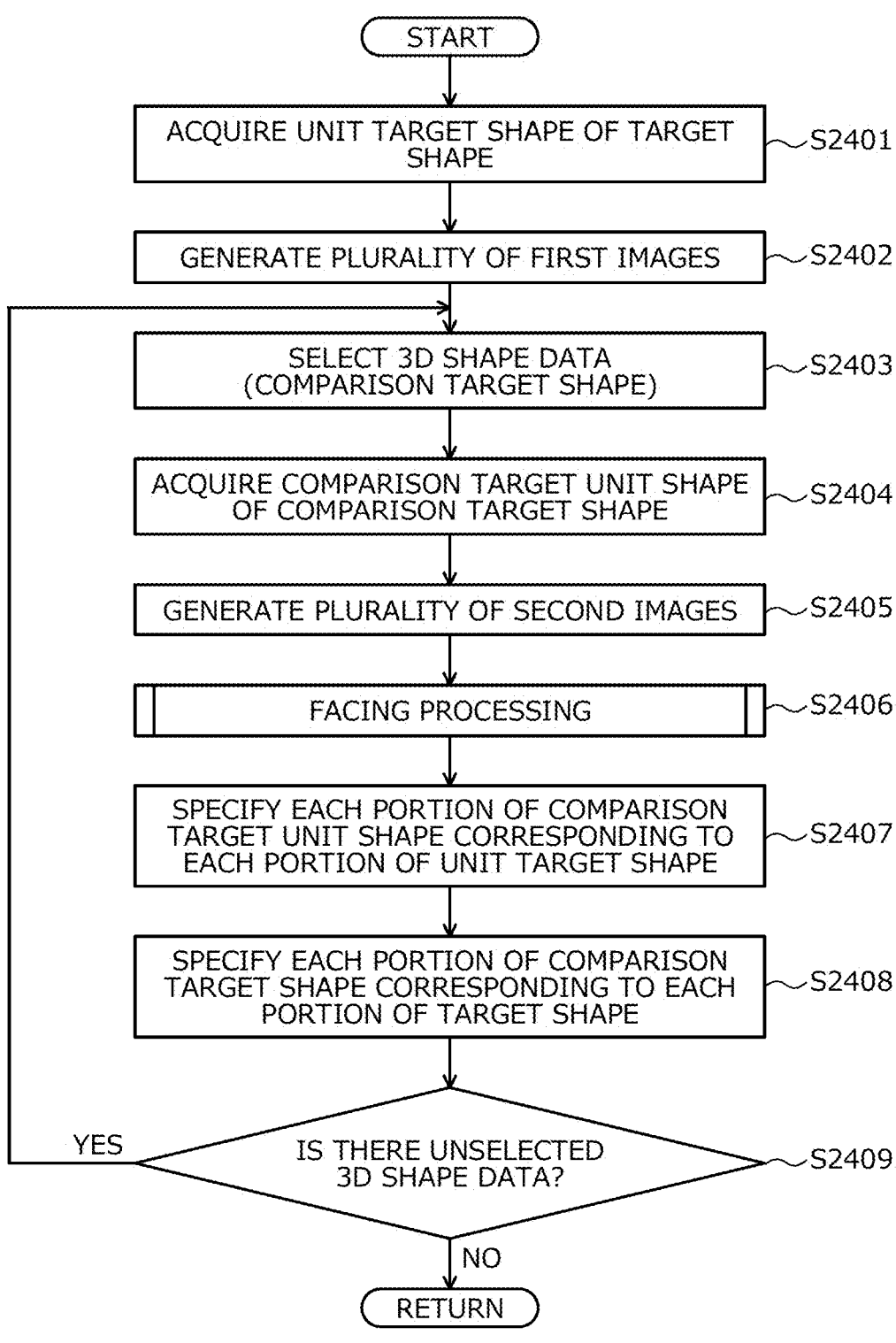
FIG. 24 is a flowchart illustrating an example of a specific processing procedure of association processing.

FIG. 24 is a flowchart illustrating an example of the specific processing procedure of the association processing. In the flowchart in FIG. 24, first, the model generation device 201 acquires the unit target shape (unit 3D shape data) of the target shape (step S2401). The target shape corresponds to the first 3D shape data described above. The unit target shape is created by normalizing the target shape for each component in each coordinate axis direction.

Then, the model generation device 201 generates the plurality of first images by generating an image imaged from each direction by rotating the unit target shape around the axis by 90 degrees, for each of the both directions (positive and negative directions) of each of the x axis, the y axis, and the z axis (step S2402).

Next, the model generation device 201 selects the unselected 3D shape data that is not selected from the group classified in step S2204 (step S2403). The 3D shape data to be selected here corresponds to the second 3D shape data described above. In the following description, the 3D shape data selected in step S2403 may be referred to as a "comparison target shape".

Then, the model generation device 201 acquires unit 3D shape data of the selected 3D shape data (step S2404). The unit 3D shape data acquired here is created by normalizing the selected 3D shape data for each component in each coordinate axis direction. In the following description, the data acquired in step S2404 may be referred to as a "comparison target unit shape".

Next, the model generation device 201 generates the plurality of second images by generating an image imaged from each direction by rotating the comparison target unit shape around the axis by 90 degrees, for each of the both directions (positive and negative directions) of each of the x axis, the y axis, and the z axis (step S2405).

Then, the model generation device 201 executes facing processing for aligning directions of the unit target shape and the comparison target unit shape (step S2406). A specific processing procedure of the facing processing will be described later with reference to FIG. 25.

Next, the model generation device 201 specifies each portion of the comparison target unit shape corresponding to each portion of the unit target shape of which the directions are aligned (step S2407). Then, the model generation device 201 specifies each portion (second portion) of the comparison target shape corresponding to each portion (first portion) of the target shape, based on the specified result (step S2408).

Next, the model generation device 201 determines whether or not there is unselected 3D shape data that is not selected from the group classified in step S2204 (step S2409). Here, in a case where there is the unselected 3D shape data (step S2409: Yes), the model generation device 201 returns to step S2403.

On the other hand, in a case where there is no unselected 3D shape data (step S2409: No), the model generation device 201 returns to the step in which the association processing is called. As a result, the model generation device 201 can specify a correspondence relationship between each portion (first portion) of the target shape and each portion (second portion) of the comparison target shape.

Next, the specific processing procedure of the facing processing in step S2406 illustrated in FIG. 24 will be described with reference to FIG. 25. This facing processing corresponds to the method 1 for aligning the directions of the third unit 3D shape data (unit target shape) described above and the fourth unit 3D shape data (comparison target unit shape).

Figure 25:
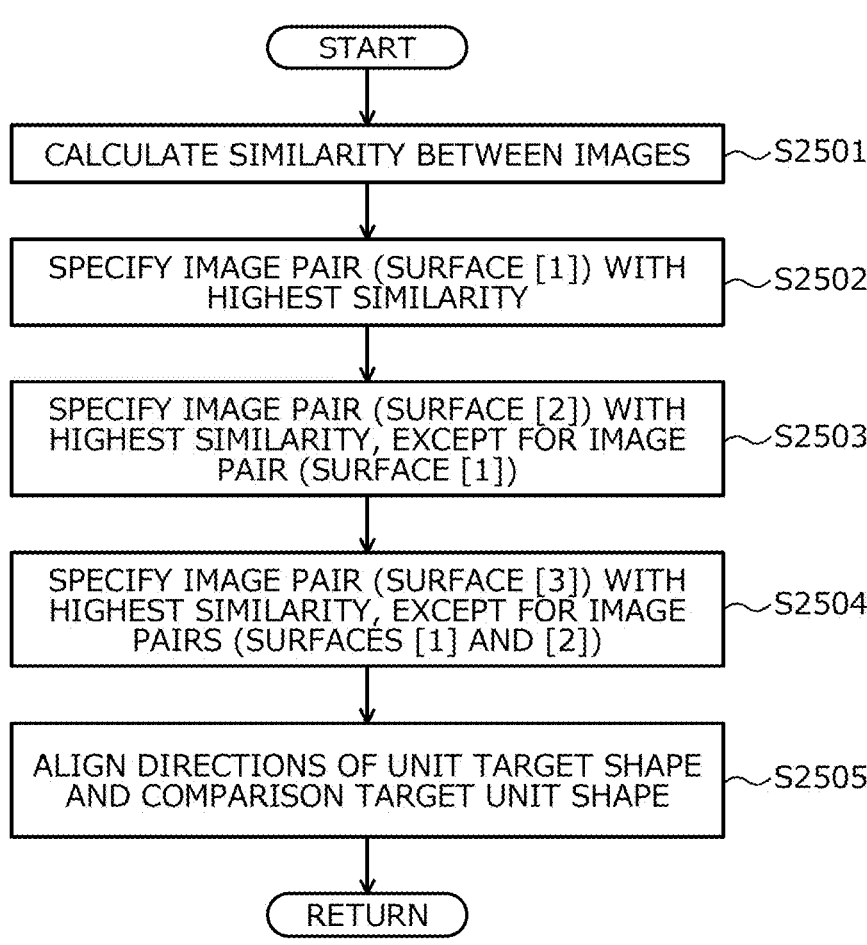
FIG. 25 is a flowchart illustrating an example of a specific processing procedure of facing processing.

FIG. 25 is a flowchart illustrating an example of the specific processing procedure of the facing processing. In the flowchart in FIG. 25, first, the model generation device 201 compares each of the plurality of first images with each of the plurality of second images and calculates a similarity between the images (step S2501).

Next, the model generation device 201 specifies an image pair (surface [1]) with the highest similarity, based on the calculated similarity between the images (step S2502). Next, the model generation device 201 specifies an image pair (surface [2]) with the highest similarity, except for the specified image pair (surface [1]), based on the calculated similarity between the images (step S2503).

Next, the model generation device 201 specifies an image pair (surface [3]) with the highest similarity, except for the specified image pairs (surfaces [1] and [2]), based on the calculated similarity between the images (step S2504).

Then, the model generation device 201 aligns the directions of the unit target shape and the comparison target unit shape based on the specified image pairs (surfaces [1], [2], and [3]) (step S2505) and returns to the step in which the facing processing is called.

As a result, the model generation device 201 can compare the surfaces of the unit target shape (24 sheets) and the surfaces of the comparison target unit shape (24 sheets) in a round-robin manner, specify three surfaces corresponding between the pieces of unit 3D data, and align the directions of the unit target shape and the comparison target unit shape.

Next, the specific processing procedure of the dimensional information addition processing in step S2206 illustrated in FIG. 22 will be described with reference to FIGS. 26 and 27.

Figure 26:
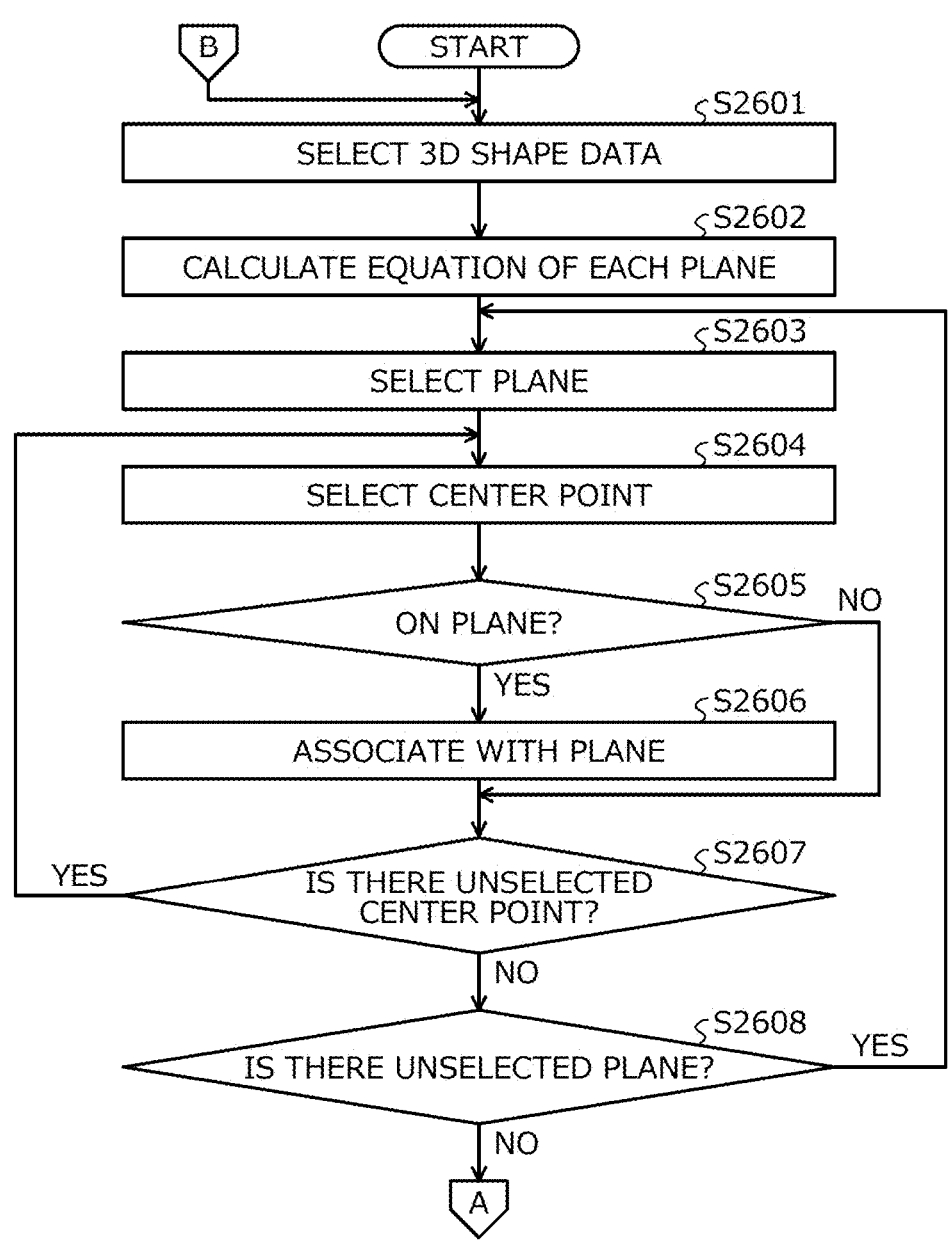
FIG. 26 is a flowchart (part 1) illustrating an example of a specific processing procedure of dimensional information addition processing.
Figure 27:
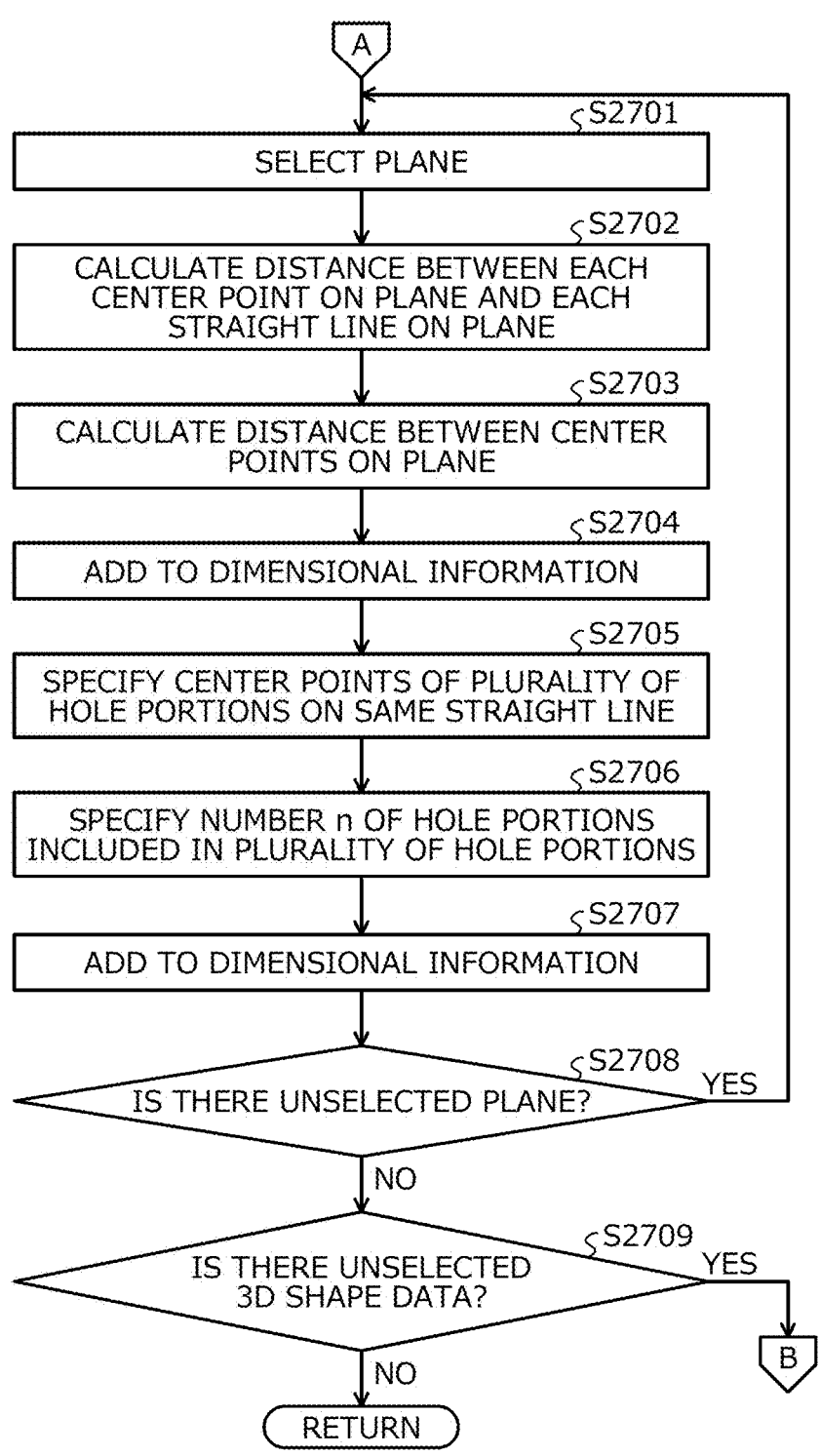
FIG. 27 is a flowchart (part 2) illustrating an example of the specific processing procedure of the dimensional information addition processing.

FIGS. 26 and 27 are flowcharts illustrating an example of the specific processing procedure of the dimensional information addition processing. In the flowchart in FIG. 26, first, the model generation device 201 selects unselected 3D shape data that is not selected, of the 3D shape data in the classified group (step S2601).

Next, the model generation device 201 calculates an equation of each plane $p_i$ (=$p_1$, $p_2$, . . . ) of the selected 3D shape data (step S2602). For example, the model generation device 201 selects three end points of any one of straight lines in the selected 3D shape data and calculates the equation of the plane $p_i$. The model generation device 201 selects the end points from the selected 3D shape data in a round-robin manner and calculates the equation of each plane $p_i$.

Then, the model generation device 201 selects the unselected plane $p_i$ that is not selected, from among the planes in the selected 3D shape data (step S2603). Next, the model generation device 201 selects an unselected center point $O_j$ that is not selected from among the center points $O_j$ (=$O_1$, $O_2$, . . . ) of the curve portion and the hole portion in the selected 3D shape data (step S2604). Then, the model generation device 201 determines whether or not the selected center point $O_j$ is on the plane $p_i$, using the equation of the selected plane $p_i$ (step S2605).

Here, in a case where the center point $O_j$ is not on the plane $p_i$ (step S2605: No), the model generation device 201 proceeds to step S2607. On the other hand, in a case where the center point $O_j$ is on the plane $p_i$ (step S2605: Yes), the model generation device 201 associates the selected center point $O_j$ with the plane $p_i$ (step S2606).

Next, the model generation device 201 determines whether or not there is an unselected center point that is not selected from among the center points $O_j$ of the curve portion and the hole portion in the selected 3D shape data (step S2607). Here, in a case where there is the unselected center point (step S2607: Yes), the model generation device 201 returns to step S2604.

On the other hand, in a case where there is no unselected center point (step S2607: No), the model generation device 201 determines whether or not there is an unselected plane that is not selected from among the planes in the selected 3D shape data (step S2608). Here, in a case where there is an unselected plane (step S2608: Yes), the model generation device 201 returns to step S2603.

On the other hand, in a case where there is no unselected center point (step S2608: No), the model generation device 201 proceeds to step S2701 illustrated in FIG. 27.

In the flowchart in FIG. 27, first, the model generation device 201 selects an unselected plane $p_i$ that is not selected from among the planes in the selected 3D shape data (step S2701). Then, the model generation device 201 calculates a distance (first distance) between each center point $O_j$ on the selected plane $p_i$ and each straight line on the plane (step S2702).

Next, the model generation device 201 calculates a distance (second distance) between the center points of the different hole portions on the selected plane $p_i$ (step S2703). Then, the model generation device 201 adds each calculated distance to the dimensional information of each portion (curve portion and hole portion) (step S2704).

Next, the model generation device 201 specifies the center points of the plurality of hole portions on the same straight line on the selected plane $p_i$ (step S2705). For example, a combination of possible center points is searched in a round-robin manner on the selected plane $p_i$, and combinations of all the center points on the same straight line are specified. Then, the model generation device 201 specifies the number n of hole portions included in the plurality of specified hole portions (step S2706). For example, the number n is specified for the combinations of all the center points.

Next, the model generation device 201 adds the specified number n to the corresponding dimensional information to the plane $p_i$ (step S2707). Note that, in a case where there is no center point of the plurality of hole portions on the same straight line on the plane $p_i$, the model generation device 201 skips steps S2705 to S2707.

Then, the model generation device 201 determines whether or not there is an unselected plane that is not selected from among the planes in the selected 3D shape data (step S2708). Here, in a case where there is an unselected plane (step S2708: Yes), the model generation device 201 returns to step S2701.

On the other hand, in a case where there is no unselected plane (step S2708: No), the model generation device 201 determines whether or not there is unselected 3D shape data that is not selected from among the 3D shape data in the classified group (step S2709). Here, in a case where there is unselected 3D shape data (step S2709: Yes), the model generation device 201 returns to step S2601 illustrated in FIG. 26.

On the other hand, in a case where there is no unselected 3D shape data (step S2709: No), the model generation device 201 returns to the step in which the dimensional information addition processing is called.

As a result, the model generation device 201 can add a new dimension (first distance and second distance) representing the design intent to the dimensional information, for the curve portion (for example, arc-shaped edge portion) or the hole portion in the 3D shape data.

Next, the specific processing procedure of the relational expression construction processing in step S2207 illustrated in FIG. 22 will be described with reference to FIG. 28.

Figure 28:
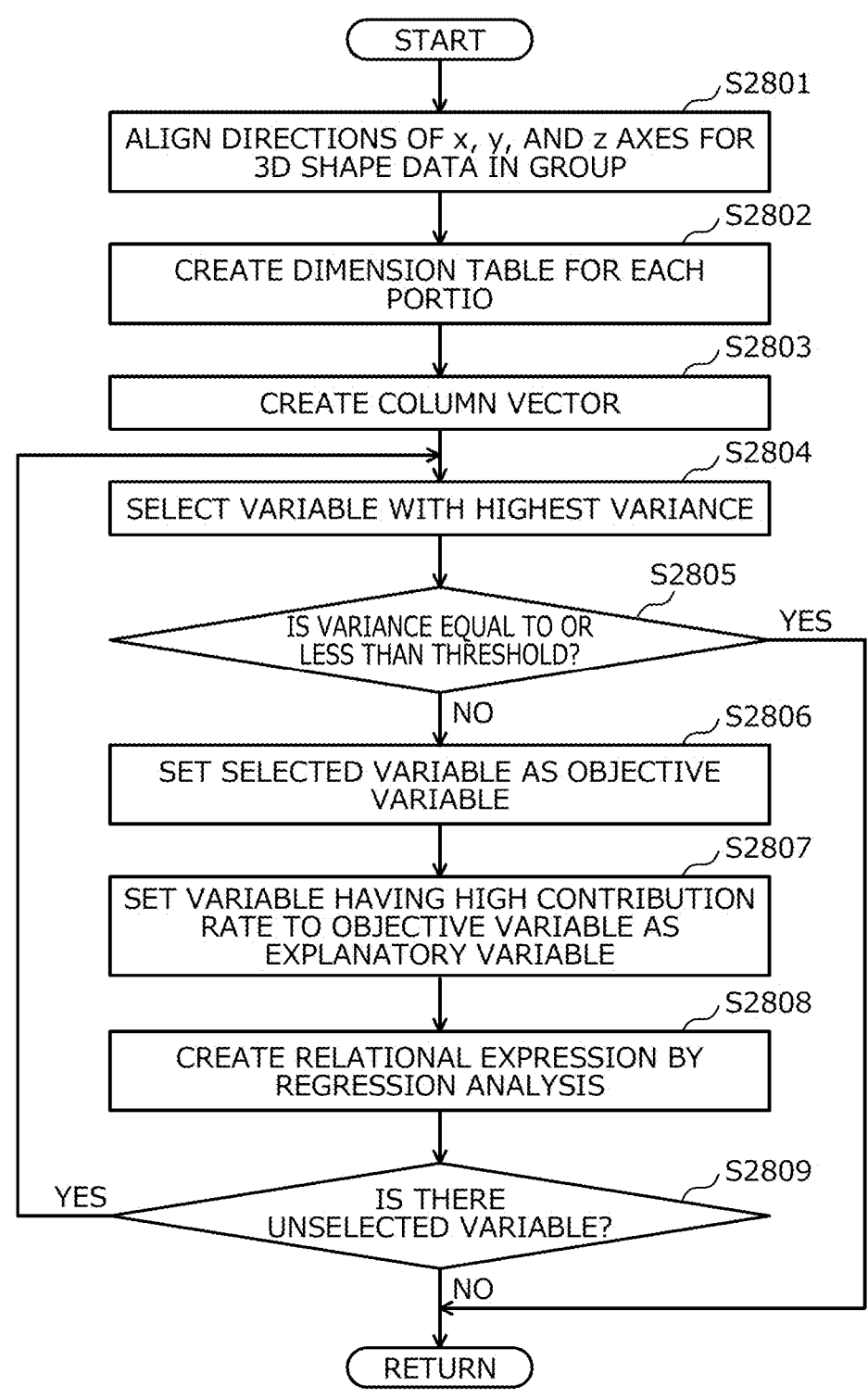
FIG. 28 is a flowchart illustrating an example of a specific processing procedure of relational expression construction processing.

FIG. 28 is a flowchart illustrating an example of the specific processing procedure of the relational expression construction processing. In the flowchart in FIG. 28, first, the model generation device 201 aligns the directions of the x axis, the y axis, and the z axis, for the 3D shape data in the group classified in step S2204, based on the result in step S2406 (step S2801).

Next, the model generation device 201 creates a dimension table of each portion of the 3D shape data in the group, by extracting the dimension of each portion in the 3D shape data in the group, based on the result in step S2408 (step S2802). Then, the model generation device 201 refers to the created dimension table of each portion and creates a column vector using the dimension in each 3D shape data as an element, for each portion (step S2803).

Next, the model generation device 201 selects a variable with the highest variance using the created column vector of each portion as a variable (step S2804). Then, the model generation device 201 determines whether or not the variance of the selected variable is equal to or less than a predetermined threshold (step S2805). The predetermined threshold can be arbitrarily set.

Here, in a case where the variance is equal to or less than the predetermined threshold (step S2805: Yes), the model generation device 201 returns to the step in which the relational expression construction processing is called.

On the other hand, in a case where the variance is larger than the predetermined threshold (step S2805: No), the model generation device 201 sets the selected variable as the objective variable (step S2806). Next, the model generation device 201 sets a variable having a high contribution rate to the objective variable as the explanatory variable by a stepwise method (step S2807).

Then, the model generation device 201 creates the dimensional relational expression between the different portions of the 3D shape data by the regression analysis based on the created column vector (step S2808). Next, the model generation device 201 determines whether or not there is an unselected variable that is not selected (step S2809). Here, in a case where there is an unselected variable (step S2809: Yes), the model generation device 201 returns to step S2804. On the other hand, in a case where there is no unselected variable (step S2809: No), the model generation device 201 returns to the step in which the relational expression construction processing is called.

As a result, the model generation device 201 can construct the relational expression indicating the dimensional relationship between the different portions of the 3D shape data classified into the same group. At this time, the model generation device 201 can derive the dimensional relationship between the portions that represents the intention of the designer, for the curve portion (for example, arc-shaped edge portion) and the hole portion.

Next, the specific processing procedure of the hole position model construction processing in step S2208 illustrated in FIG. 22 will be described with reference to FIG. 29. The hole position model construction processing is executed for each plane $p_i$ in each 3D shape data in the group classified in step S2204, for example.

Figure 29:
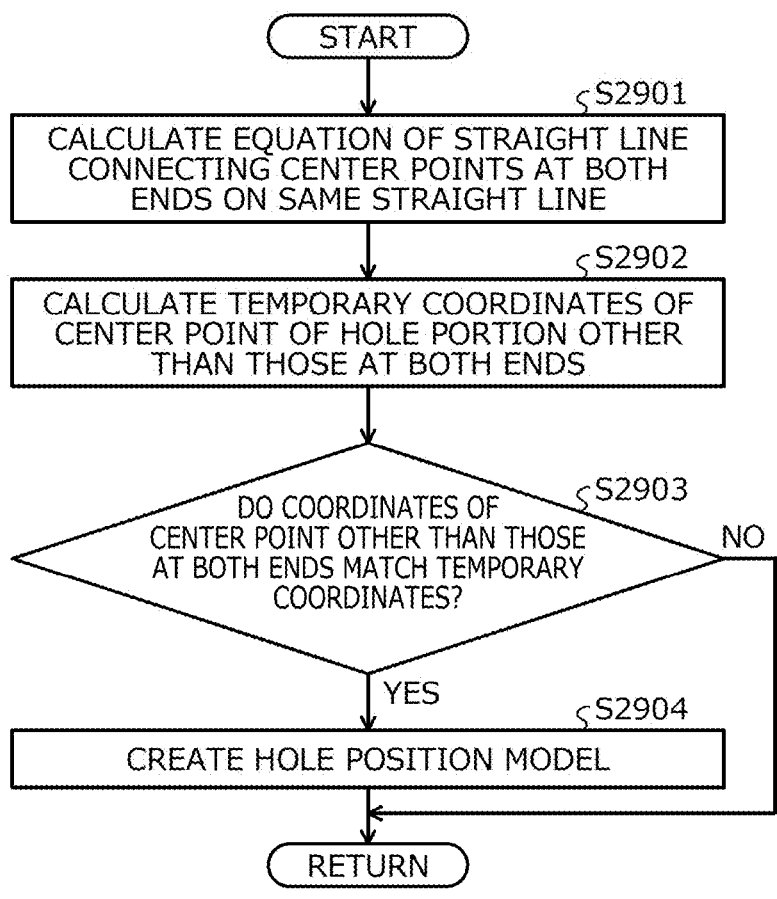
FIG. 29 is a flowchart illustrating an example of a specific processing procedure of hole position model construction processing.

FIG. 29 is a flowchart illustrating an example of the specific processing procedure of the hole position model construction processing. In the flowchart in FIG. 29, first, the model generation device 201 calculates an equation of a straight line connecting the center points of the hole portions at both ends among the center points of the plurality of hole portions on the same straight line, on the plane $p_i$ in the 3D shape data (step S2901).

Next, the model generation device 201 calculates temporary coordinates of the center point of the hole portion other than those at both ends, among the center points of the plurality of hole portions on the same straight line, from the calculated equation of the straight line, the number n of hole portions, and the hole position model (step S2902). The hole position model is represented, for example, by the above formula (14).

For example, the model generation device 201 calculates a distance $d_i$ (distance of equal interval) between the center points, by substituting the number n of hole portions and the distance $d_0$ between the center points of the hole portions at both ends into the above formula (14). Then, the model generation device 201 calculates temporary coordinates of the center point of the hole portion other than those at both ends, from the calculated distance $d_i$, the center points of the hole portions at both ends, and the equation of the straight line.

Then, the model generation device 201 determines whether or not the coordinates of the center point of the hole portion other than those at both ends match the calculated temporary coordinates (step S2903). Here, in a case where the coordinates match the temporary coordinates (step S2903: Yes), the model generation device 201 creates a hole position model for the plane $p_i$ by substituting the number n of hole portions into the above formula (14) (step S2904) and returns to the step in which the hole position model construction processing is called.

On the other hand, in a case where the coordinates do not match the temporary coordinates (step S2903: No), the model generation device 201 returns to the step in which the hole position model construction processing is called. Note that the processing in steps S2901 to S2904 is executed, for example, for each combination of the plurality of hole portions on the same straight line on the plane $p_i$.

As a result, the model generation device 201 can construct the hole position model representing the positional relationship between the plurality of hole portions on the plane $p_i$, for the plane $p_i$ in the 3D shape data.

As described above, according to the model generation device 201 according to the embodiment, for the specific portion of which the center point is defined among the plurality of portions included in the shape indicated by each of the pieces of 3D shape data classified into the same group, it is possible to calculate the first distance between the center point of each 3D shape data and the straight line on the same plane as the center point. Then, according to the model generation device 201, it is possible to add the calculated first distance to the dimensional information of the specific portion in each 3D shape data and to specify the dimensional relationship between the different portions of the 3D shape data in the group, based on the dimensional information for each portion in each 3D shape data in the group.

As a result, the model generation device 201 can add the new dimension (first distance) that represents the intention of the designer, for the specific portion in the 3D shape data and derive the dimensional relationship between the different portions of the 3D shape data. Therefore, the model generation device 201 can construct the parametric model that reflects the design intent.

Furthermore, according to the model generation device 201, the first distance can be calculated for the curve portion of which the center point, the radius, the center angle, and the end point are defined. The curve portion is, for example, an arc-shaped edge portion.

As a result, in a case of the 3D shape data including the curve portion like the arc-shaped edge portion, the model generation device 201 can define a new dimension representing a positional relationship with the straight line on the same plane, for the curve portion. Therefore, the model generation device 201 can add the new dimension representing the intention of the designer for the curve portion, and derive the dimensional relationship between the different portions in the 3D shape data.

Furthermore, according to the model generation device 201, it is possible to calculate the first distance, for the hole portion of which the center point and the radius are defined. The hole portion is, for example, a through-hole that passes through each 3D shape data or a recessed hole on each 3D shape data.

As a result, in a case of 3D shape data including the hole portion (hole, through-hole, or the like), the model generation device 201 can define a new dimension representing a positional relationship with the straight line on the same plane, for the hole portion. Therefore, the model generation device 201 can add the new dimension representing the intention of the designer for the hole portion, and derive the dimensional relationship between the different portions in the 3D shape data.

Furthermore, according to the model generation device 201, for the hole portion of which the center point and the radius are defined, it is possible to calculate the second distance between the center point of the hole portion and the center point of another hole portion on the same plane as the center point in each 3D shape data. Then, according to the model generation device 201, it is possible to add the calculated second distance to the dimensional information of the hole portion in each 3D shape data.

As a result, the model generation device 201 can define the new dimension (second distance) representing the positional relationship with the another hole portion on the same plane, for the hole portion (hole, through-hole, or the like). Therefore, the model generation device 201 can further add the new dimension representing the intention of the designer for the hole portion, and derive the dimensional relationship between the different portions in the 3D shape data. Note that the model generation device 201 may add only the second distance representing the positional relationship with the another hole portion on the same plane for the hole portion in the 3D shape data, as the new dimension, to the dimensional information.

Furthermore, according to the model generation device 201, it is possible to delete the dimensional information of the hole portion of which the center point and the radius are defined, from each 3D shape data of the plurality of pieces of 3D shape data, normalize each 3D shape data of the plurality of pieces of 3D shape data (after deletion) from which the dimensional information of the hole portion has been deleted for each component in each coordinate axis direction, and create the unit shape data. Then, according to the model generation device 201, it is possible to classify the plurality of pieces of 3D shape data, based on the created unit shape data of each 3D shape data (after deletion).

As a result, the model generation device 201 can accurately search for the similar shape using the unit 3D shape data, even for the 3D shape data including the hole portion. For example, when converting the unit 3D shape data, the model generation device 201 can prevent a circular shape of the hole portion from becoming an elliptical shape and the accuracy of the similar shape search from being lowered.

Furthermore, according to the model generation device 201, for each of the 3D shape data and the another 3D shape data in the group, it is possible to acquire the unit shape data obtained by performing normalization for each component in each coordinate axis direction and generate the plurality of first images and the plurality of second images obtained by imaging each of the acquired unit shape data of the 3D shape data and unit shape data of the another 3D shape data from both directions of each of the plurality of axes. Furthermore, according to the model generation device 201, it is possible to specify the correspondence relationship between the portion in the 3D shape data and the portion in the another 3D shape data, by aligning the directions of the 3D shape data and the another 3D shape data, based on the comparison result between the plurality of first images and the plurality of second images. Then, according to the model generation device 201, it is possible to specify the dimensional relationship between the different portions of the 3D shape data in the group, based on the specified correspondence relationship and the dimensional information for each portion of each 3D shape data in the group.

As a result, the model generation device 201 can specify the portions having the correspondence relationship between the pieces of 3D shape data classified based on the parametric relationship.

Furthermore, according to the model generation device 201, in a case where the center point of each of the plurality of hole portions on the same straight line exists on the plane in each 3D shape data and the respective center points of the multiple hole portions are arranged at equal intervals on the straight line, it is possible to create the hole position model. The hole position model is a model (relational expression) that specifies a relationship between positions of different hole portions on the plane, from an interval between the center points of the hole portions at both ends of the plurality of hole portions and an interval between the center points of the adjacent hole portions of the plurality of hole portions, based on the number of hole portions included in the plurality of hole portions.

As a result, the model generation device 201 can make it possible to grasp the relationship that periodically occurs and discretely appears, for the plurality of hole portions on the same straight line.

Furthermore, according to the model generation device 201, it is possible to output information indicating the specified relationship of the dimensions, in association with the unit 3D shape data corresponding to the 3D shape data in the group.

As a result, the model generation device 201 can easily create design data according to the design intent, according to the parametric model, based on the unit 3D shape data.

Furthermore, according to the model generation device 201, when the information indicating the specified relationship of the dimensions is output, it is possible to further output the created hole position model.

As a result, the model generation device 201 can facilitate design in consideration of the relationship that periodically occurs and discretely appears, for the plurality of hole portions arranged on the same plane.

From these, according to the model generation device 201, even in the 3D shape data including the curve portion or the hole portion, it is possible to appropriately specify the dimensional relationship between the different portions of the 3D shape data and construct the parametric model that reflects the design intent. Furthermore, according to the model generation device 201, it is possible to newly design the object, using the standard shape data to which the parametric model (relational expression of dimensions between portions or hole position model) is given. As a result, the model generation device 201 can reduce the number of man-hours needed for the design of the 3D shape. The designer can reduce design mistakes by changing the dimensions of the each portion according to the parametric model at the time of newly designing the object. Furthermore, the designer can easily search for the standard shape data according to the design intent by searching for the standard shape data used at the time of newly designing the object based on the unit 3D shape data.

Note that the specifying method described in the present embodiment may be implemented by executing a program prepared in advance by a computer such as a personal computer or a workstation. The specifying program is recorded on a computer-readable recording medium such as a hard disk, a flexible disk, a CD-ROM, a DVD, or a USB memory, and is read from the recording medium to be executed by the computer. Furthermore, the specifying program may be distributed via a network such as the Internet.

Furthermore, the model generation device 201 (information processing device 101) described in the present embodiment may also be implemented by a special-purpose IC such as a standard cell or a structured application specific integrated circuit (ASIC) or a programmable logic device (PLD) such as an FPGA.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a specifying program for causing a computer to execute a process comprising:

calculating a first distance between a center point of each shape data and a straight line on a same plane as the center point, for a specific portion of which the center point is defined, from among a plurality of portions included in a shape indicated by each shape data classified into the same group;

adding the calculated first distance to dimensional information of the specific portion in each shape data; and specifying a dimensional relationship between different portions of the shape data in the group, based on the dimensional information for each portion of each shape data in the group.

2. The non-transitory computer-readable recording medium according to claim 1, wherein the specific portion is a curve portion of which a center point, a radius, a center angle, and an end point are defined.

3. The non-transitory computer-readable recording medium according to claim 1, wherein the specific portion is a hole portion, including a through-hole portion that passes through each shape data or a recessed hole portion on each shape data, of which a center point and a radius are defined.

4. The non-transitory computer-readable recording medium according to claim 3, wherein the calculating further includes calculating a second distance between the center point of the hole portion and a center point of another hole portion on the same plane as the center point in each shape data, in a case where the specific portion is the hole portion, and the adding further includes further adding the calculated second distance to the dimensional information of the specific portion in each shape data.

5. The non-transitory computer-readable recording medium according to claim 1, the process further comprising:

deleting the dimensional information of the hole portion of which the center point and the radius are defined, from each shape data of the plurality of pieces of shape data;

creating unit shape data by normalizing, for each component in each coordinate axis direction, each shape data of the plurality of pieces of shape data after deletion from which the dimensional information of the hole portion; and classifying the plurality of pieces of shape data, based on the created unit shape data of each shape data, wherein each shape data classified into the same group is shape data in the group classified by the classifying processing.

6. The non-transitory computer-readable recording medium according to claim 1, the process further comprising:

acquiring unit shape data obtained by normalizing each of the shape data and another shape data in the group for each component in each coordinate axis direction;

generating a plurality of first images and a plurality of second images obtained by imaging each of the acquired unit shape data of the shape data and unit shape data of the another shape data from both directions of each of a plurality of axes; and specifying a correspondence relationship between a portion in the shape data and a portion in the another shape data, by aligning directions of the shape data and the another shape data, based on a comparison result of the plurality of first images and the plurality of second images, wherein in the specifying the dimensional relationship, specifying the dimensional relationship between different portions of the shape data in the group, based on the specified correspondence relationship and the dimensional information for each portion of each shape data in the group.

7. The non-transitory computer-readable recording medium according to claim 1, the process further comprising:

in a case where a center point of each of a plurality of hole portions on the same straight line exists on a plane in each shape data and the respective center points of the plurality of hole portions are arranged at equal intervals on the straight line, creating a hole position model that specifies a relationship between positions of different hole portions on the plane, from an interval between center points of hole portions at both ends of the plurality of hole portions and an interval between center points of adjacent hole portions of the plurality of hole portions, based on the number of hole portions included in the plurality of hole portions.

8. The non-transitory computer-readable recording medium according to claim 1, the process further comprising:

outputting information that indicates the specified dimensional relationship, in association with unit shape data that corresponds to the shape data in the group.

9. A specifying method performed by a computer, the method comprising:

calculating a first distance between a center point of each shape data and a straight line on a same plane as the center point, for a specific portion of which the center point is defined, from among a plurality of portions included in a shape indicated by each shape data classified into the same group;

adding the calculated first distance to dimensional information of the specific portion in each shape data; and specifying a dimensional relationship between different portions of the shape data in the group, based on the dimensional information for each portion of each shape data in the group.

10. An information processing apparatus comprising:

a memory, and a processor coupled to the memory and configured to:

calculate a first distance between a center point of each shape data and a straight line on a same plane as the center point, for a specific portion of which the center point is defined, from among a plurality of portions included in a shape indicated by each shape data classified into the same group;

add the calculated first distance to dimensional information of the specific portion in each shape data; and specify a dimensional relationship between different portions of the shape data in the group, based on the dimensional information for each portion of each shape data in the group.

\* \* \* \* \*